(12) United States Patent
Li

(10) Patent No.: US 7,973,264 B2
(45) Date of Patent: Jul. 5, 2011

(54) TOASTER OVEN WITH LOW-PROFILE HEATING ELEMENTS

(76) Inventor: George T. C. Li, Carson City, NV (US)

( * ) Notice: Subject to any disclaimer, the term of this patent is extended or adjusted under 35 U.S.C. 154(b) by 1108 days.

(21) Appl. No.: 11/528,762

(22) Filed: Sep. 28, 2006

(65) Prior Publication Data

US 2008/0099461 A1    May 1, 2008

(51) Int. Cl.
    A21B 1/14        (2006.01)
    A21B 1/22        (2006.01)
    F27D 11/02       (2006.01)

(52) U.S. Cl. .......................... 219/404; 219/409; 219/411

(58) Field of Classification Search .................. 219/404
    See application file for complete search history.

(56) References Cited

U.S. PATENT DOCUMENTS

| | | | | |
|---|---|---|---|---|
| 1,376,829 A * | 5/1921 | Phelps | ........................... | 219/395 |
| 2,659,799 A * | 11/1953 | Ireland | ........................... | 219/542 |
| 2,848,592 A * | 8/1958 | Mergen | ........................... | 219/404 |
| 3,281,575 A * | 10/1966 | Ferguson, Jr. | ................. | 219/404 |
| 4,675,507 A * | 6/1987 | Akiyoshi et al. | ............... | 219/406 |
| 4,745,246 A * | 5/1988 | Hori et al. | ..................... | 219/685 |
| 4,880,952 A * | 11/1989 | Hirai et al. | ..................... | 219/685 |
| 5,272,317 A | 12/1993 | Ryu | ............................... | 219/403 |
| 5,534,681 A * | 7/1996 | Hwang | ........................... | 219/685 |
| 5,694,831 A | 12/1997 | Haroun et al. | ................ | 99/339 |
| 5,938,959 A | 8/1999 | Wang | ............................... | 219/401 |
| 6,091,057 A | 7/2000 | Asami et al. | ................... | 219/404 |
| 6,242,716 B1 * | 6/2001 | Wang | ............................... | 219/404 |
| 6,476,360 B1 | 11/2002 | Huggler et al. | ............... | 219/386 |
| 6,509,550 B1 | 1/2003 | Li | ................................. | 219/433 |
| 6,515,262 B1 * | 2/2003 | Li | ................................. | 219/429 |
| 6,545,251 B2 * | 4/2003 | Allera et al. | .................. | 219/394 |
| 6,686,569 B2 | 2/2004 | Li | ................................. | 219/433 |
| 6,867,394 B2 | 3/2005 | Li | ................................. | 219/433 |
| 6,884,971 B2 * | 4/2005 | Li | ................................. | 219/436 |
| 7,012,221 B2 | 3/2006 | Li | ................................. | 219/433 |
| 7,220,945 B1 * | 5/2007 | Wang | ............................ | 219/392 |
| 7,317,174 B2 * | 1/2008 | Lau et al. | ..................... | 219/404 |

FOREIGN PATENT DOCUMENTS

DE         4030278 A1 *  5/1992
JP         62299627 A  * 12/1987

* cited by examiner

Primary Examiner — Joseph M Pelham
(74) Attorney, Agent, or Firm — Clifford F. Rey

(57) ABSTRACT

A toaster oven appliance including low-profile heating elements having a predetermined single-sided surface area calculated to provide uniform heating within the cooking chamber, facilitate cleaning and to increase its usable capacity is disclosed. Various alternative configurations of top, bottom, and side-mounted heating elements in combination with both fixed and vertically movable heating element embodiments are provided for use with standard and digital controls. The heating elements are positioned both internally and externally of the cooking chamber and are provided in unsheathed, plain-sheathed, and metallic-sheathed types for a given application of the present oven. In one embodiment the heating elements are constructed as removable plug-in modules for convenient cleaning and replacement. The present toaster oven further includes an optional forced convection fan to reduce cooking temperature and shorten cooking cycles. An optional rotisserie mechanism is also provided in conjunction with the aforementioned combinations of heating elements and heating controls.

27 Claims, 33 Drawing Sheets

TOASTER OVEN WITH LOW-PROFILE HEATING ELEMENTS

BACKGROUND OF THE INVENTION

The present invention relates to household appliances and, more particularly to a toaster oven appliance including low-profile heating elements, which provides more uniform heating, facilitate cleaning of the interior cavity, and increase the useable capacity of the oven.

Conventional toaster ovens typically utilize tubular heating elements mounted within the cooking chamber of the toaster oven. Typically an array of either two or four tubular heating elements are disposed on the inner top and/or bottom walls of the cooking chamber. Such heating elements may be constructed from stainless steel tubing or other suitable tubing wherein an electrical resistance heating wire is enclosed.

However, such heating elements have numerous disadvantages. The use of tubular heating elements provides non-uniform heating due to their position in relation to the foodstuffs in the cooking chamber. This results in a longer cooking cycle for bread and related food items than a conventional toaster. Tubular heating elements inherently make cleaning the oven more difficult and reduce the usable capacity of the oven being mounted in spaced-apart relation to the interior walls thereof.

Another disadvantage of conventional toaster ovens is the construction of the cooking chamber itself. A conventional toaster oven comprises three to four sheet metal panels secured by fasteners such as rivets to form the cooking chamber. Such toaster oven construction is relatively complex and substantially increases manufacturing costs.

One example of such a prior art toaster oven is disclosed in U.S. Pat. No. 5,694,831 to Haroun et al. which teaches a household appliance that permits simultaneous toasting of bread and cooking of food in separate cavities that are arranged within a housing wherein each of the housings is provided with respective heating elements. One of the heating elements utilized in the toaster cavity may be shiftable from a first position in the toaster compartment to a second position in the oven cavity (see Haroun et al. FIGS. 3-4).

Various other ovens with movable heating elements are known in the prior art. For example, U.S. Pat. No. 6,091,057 to Asami et al. discloses a broiler oven having a heating chamber 2, first and second movable heaters 61, 62 formed out of tubular heaters and rotatably supported by the inner walls of the heating chamber in such a way that their heating portions 62a, 62b and their shaft portions 61a, 62a joined together so as to be parallel to each other by their arm portions 61c, 62c are held at an equal level, a driving mechanism 12 for rotating the shaft portions, and a control circuit 10 for controlling the first and second movable heaters.

Another example of an oven with an automatically movable shelf is disclosed in U.S. Pat. No. 5,938,959 to Wang which teaches a domestic oven including a housing defining a cooking chamber, at least one stationary first heating element in the chamber, a second heating element mounted to the shelf, and a drive operatively connected to the shelf for translating the shelf, together with the second heating element, in the housing.

However, it will be appreciated that both the Asami et al. ('057) and Wang ('959) references utilize tubular heating elements (ie. CALROD type) described hereinabove, which effectively reduce the usable capacity of the cooking chamber and make cleaning the oven more difficult.

U.S. Pat. No. 6,476,360 to Huggler et al. discloses a method of manufacturing a unitary shell structure for a heating appliance (i.e. a toaster) providing a shell having first and second side panels and first and second end panels. The first end panel has an opening. A first outer heating element is inserted through the opening and attached to the first side panel during assembly. A second outer heating element is inserted through the opening and attached to the second side panel. It will be noted that the Huggler et al. patent is directed to a conventional toaster with a vertically-oriented chamber and not to a toaster oven with a horizontally-oriented chamber as in the manner of the present invention.

U.S. Pat. No. 7,012,221 to Li; U.S. Pat. No. 6,867,394 to Li; U.S. Pat. No. 6,686,569 to Li; and U.S. Pat. No. 6,509,550 to Li, which are commonly owned by this applicant, are also considered of interest with respect to heating element construction.

While these devices fulfill their respective, particular objectives and requirements, the aforementioned patents do not disclose the present toaster oven with adjustable low-profile heating elements, which increase the usable capacity of the cooking chamber, facilitate cleaning of the interior cooking cavity, and reduce the cooking time required for common food items.

SUMMARY OF THE INVENTION

Accordingly, the present invention is a toaster oven appliance including low-profile heating elements that increase the usable capacity within the cooking chamber, facilitate cleaning, and improve energy efficiency by providing uniform heating within the present appliance. In at least one embodiment of the present toaster oven a heating element can be shifted into close proximity to food items to reduce cooking times for common food items. Various alternative configurations of top, bottom, and side-mounted heating elements in combination with both fixed and vertically movable heater embodiments are disclosed. The present toaster oven further provides an optional convection fan and/or a rotisserie mechanism, which are utilized in conjunction with the aforementioned combinations of top, bottom, and side-mounted heating elements. The operation of the present toaster oven is regulated by conventional mechanical switches and rheostatic controls or, alternatively, by a digital control panel with a touch-screen interface.

There has thus been outlined, rather broadly, the important features of the invention in order that the detailed description thereof that follows may be better understood, and in order that the present contribution to the art may be better appreciated. There are additional features of the invention that will be described hereinafter and which will form the subject matter of the claims appended hereto.

Those skilled in the art will appreciate that the conception upon which this disclosure is based may readily be utilized as a basis for the designing of other structures, methods, and systems for carrying out the purposes of the present invention. It is important, therefore, that the claims be regarded as including such equivalent constructions insofar as they do not depart from the spirit and scope of the present invention.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENTS

Figure 1:
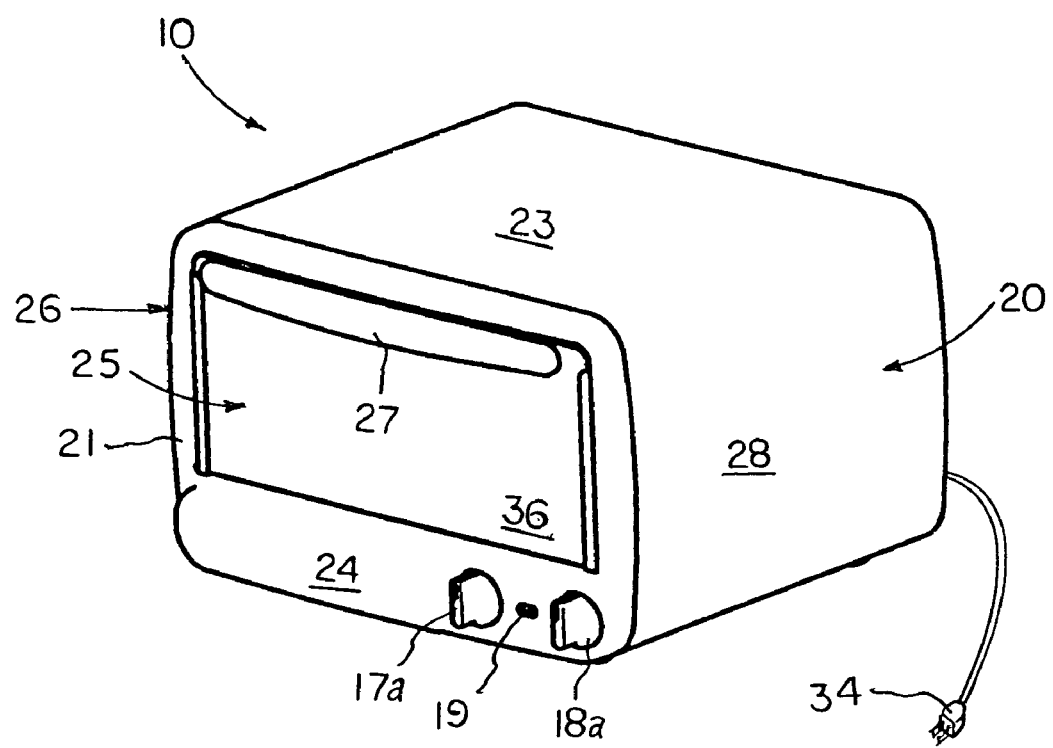
FIG. 1 is a perspective view of the toaster oven of the present invention.

With further reference to the drawings there is shown therein an embodiment of a toaster oven in accordance with the present invention, indicated generally at 10 and illustrated in FIG. 1, although it will be appreciated that the present invention is not limited in scope to this embodiment. The present oven 10 is comprised of an outer housing, indicated generally at 20, including an openable front door, indicated generally at 25, which further includes a viewing window 36 and a door handle 27 for opening and closing door 25.

Figure 2A:
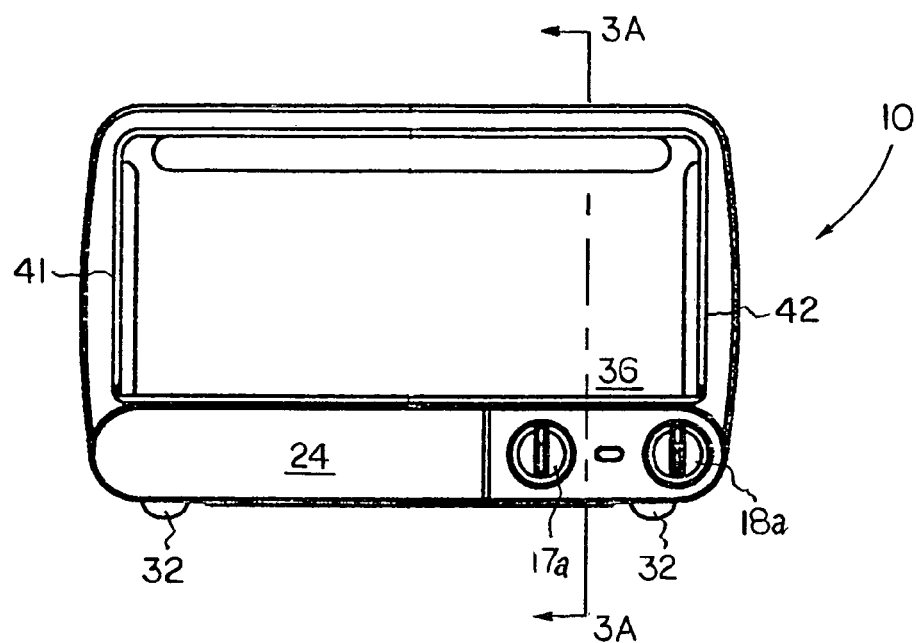
FIG. 2A is a front elevation view of the present toaster oven.
Figure 2B:
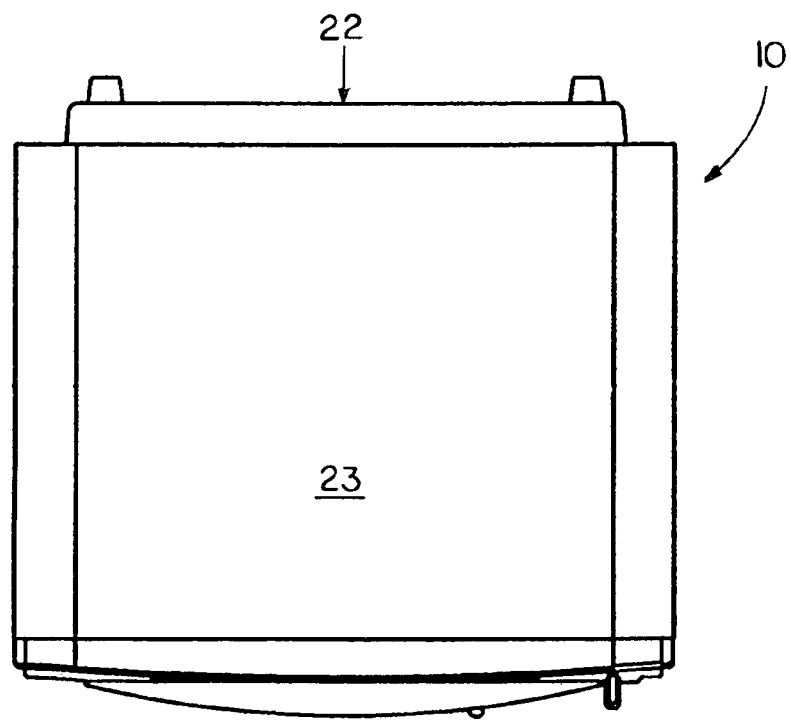
FIG. 2B is a top plan view of the present toaster oven.

More particularly, outer housing 20 further comprises a front side 21, backside 22 (FIG. 2B), top side 23, base 24, and side walls 26, 28. The base 24 of housing 20 is provided with a plurality of feet 32 (FIG. 2A) which support the oven 10 on a working surface while keeping the base 24 elevated from the surface.

Figure 3A:
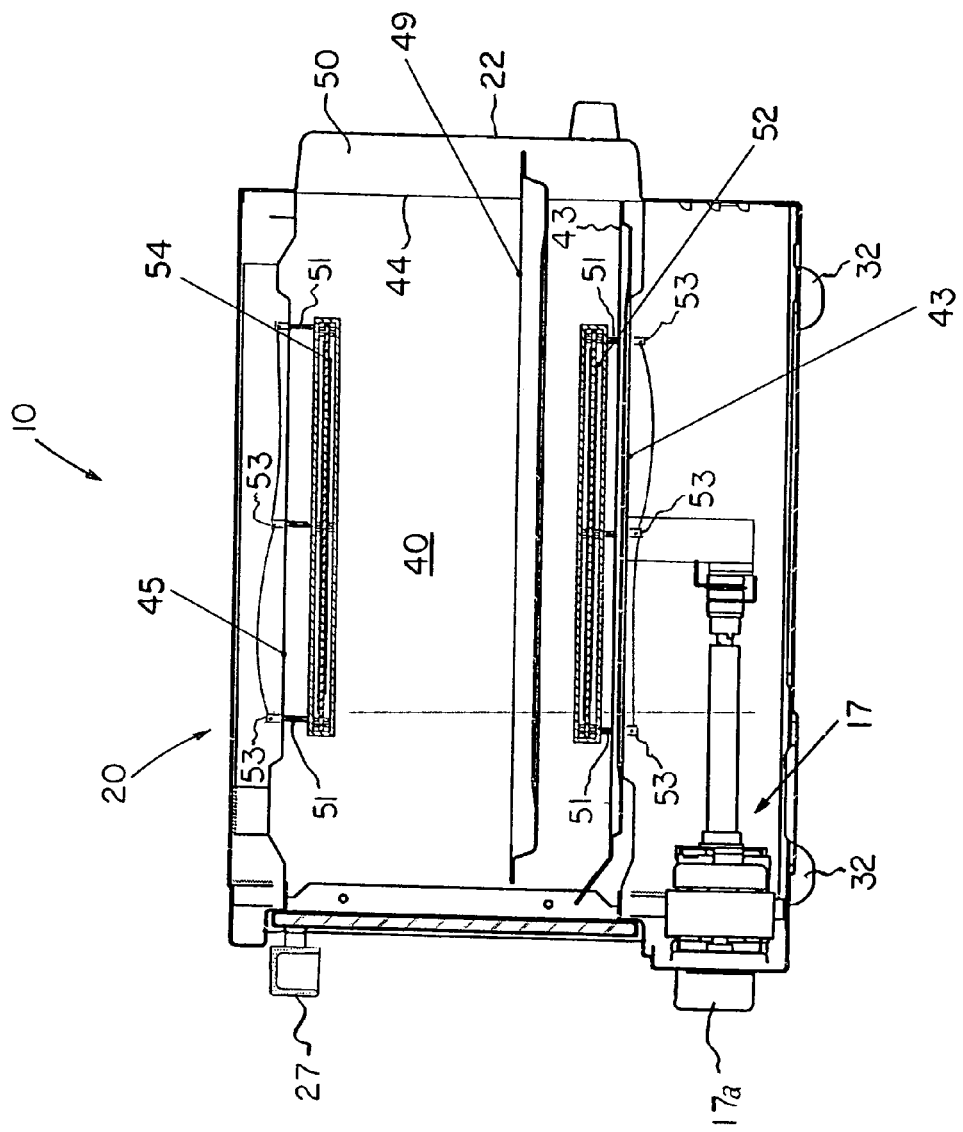
FIG. 3A is a transverse cross-section of the present toaster oven taken along section line 3A-3A of FIG. 2A.

As illustrated in FIG. 3A an oven cavity liner 40 defining a cooking chamber comprises opposite cavity sidewalls 41, 42, bottom surface 43, back wall 44, and top surface 45. Cavity sidewalls 41, 42 are disposed in parallel to housing sidewalls 26, 28. Similarly, cavity bottom and top surfaces 43, 45 are disposed in parallel to housing base 24 and top side 23 of housing 20 respectively. Cavity back wall 44 is disposed in parallel, spaced-apart relation to housing back wall 22. Thus, an insulating airspace as at 50 is provided which surrounds cavity liner 40 to shield internal components thereof and to protect the user from exposure to high temperatures during operation of the appliance. An oven tray or pan 49 is also provided to support food items within the cavity liner 40 for cooking.

In accordance with the present invention, cavity liner 40 is a unitary construction, which can be fabricated using various manufacturing methods. To simplify manufacture and assembly of the toaster oven 10, cavity liner 40 can be formed using a so-called deep-drawing technique resulting in a cavity liner as illustrated in FIGS. 4A-4D. Drawing forms sheet metal into cylindrical or box-shaped parts by using a punch (not shown) which presses a sheet metal blank having predetermined dimensions into a die cavity. The blank is drawn into the die cavity (not shown) at controlled temperature and may be annealed to relieve stress in the sheet metal. Deep drawing is a type of metal drawing process wherein the depth of the part is greater than its interior dimension FIGS. 5A-5D illustrate another embodiment of a cavity liner 40' wherein welded seam construction is utilized. In this manufacturing method a single blank of sheet metal is folded 90 degrees onto itself along fold lines 61, 62, 63, 64 until the opposed lateral ends of the blank abut each other forming an open-ended, rectangular cavity liner 40'. Thereafter, the abutting lateral ends are welded along their entire length to form a weld seam, indicated generally at 65. In the embodiment shown an optional flange member 66 is tack welded about an open end of the cavity liner 40' as shown to facilitate assembly.

FIGS. 6A-6E illustrate another embodiment of cavity liner 40" wherein a fold and lock seam technique is utilized to provide a unitary construction. In this manufacturing method a single blank of sheet metal having predetermined dimensions is folded along both lateral ends thereof in a sheet metal forming press (not shown) into the configuration most clearly shown in FIG. 6E. Thereafter, the blank is also folded at 90 degrees onto itself along fold lines 71, 72, 73 until the opposed lateral ends of the blank adjoin each other and can be interlocked as at 75 (FIG. 6E) using a suitable tool.

Referring again to FIG. 3A control knob 17a and an oven timer 18 including knob 18a are disposed on the front of housing 20 to operate the heating control mechanism, indicated generally at 17, which regulates the functions of the oven 10. Of course, control knob 17a and timer knob 18a may also be mounted on either sidewall 26, 28 in an alternate configuration of the toaster oven (not shown). In a variation of this embodiment a digital control panel, indicated generally at 120, including touch-screen interface 120a with an integrated control circuit board 122 (FIGS. 26 and 27) can be utilized to regulate the functions of the appliance. An electrical cord and plug 34 (FIG. 1) are also provided to connect toaster oven 10 with a power source via a standard electrical outlet. A power ON/OFF switch 19 is provided for the user's safety and convenience.

The present toaster oven 10 is designed for use with standard residential electrical systems. The wattage rating of the heating elements varies for a given application and capacity of the toaster oven 10.

Still referring to FIG. 3A it can be seen that a pair of vertically opposed heating elements 52, 54 are disposed within the cooking chamber. In this embodiment heating elements 52, 54 are preferably mounted in close proximity to bottom and top surfaces 43, 45 of cavity liner 40. Heating elements 52, 54 are electrically interconnected to the cooking control mechanism 17 and timer 18 to regulate the cooking functions of the oven. In the embodiment shown in FIG. 3A, heating elements 52, 54 are constructed as removable plug-in modules. More particularly, each heating element 52, 54 is provided with a plurality of quick connect electrical plugs 51, which are received in receptacles 53 that are electrically interconnected to the 110 volt power source. The modular heating elements 52, 54 are easily removed by the user for cleaning and/or replacement.

Figure 3B:
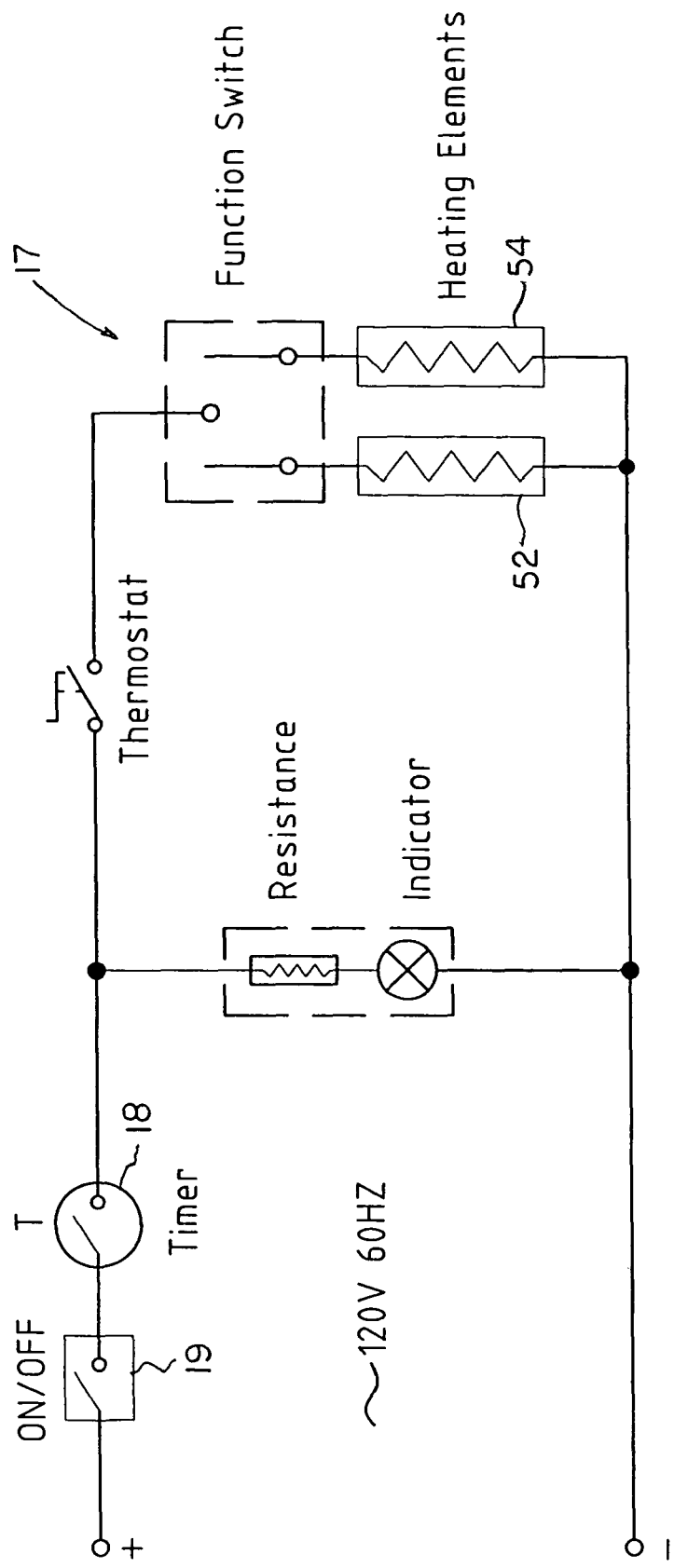
FIG. 3B is a schematic representation of the electrical components and circuitry of the embodiment of the present toaster oven shown in FIG. 3A.
Figure 4A:
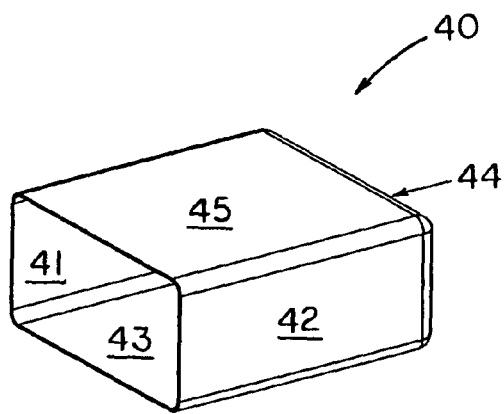
FIG. 4A is a perspective view of a cavity liner in accordance with the present invention.
Figure 4B:
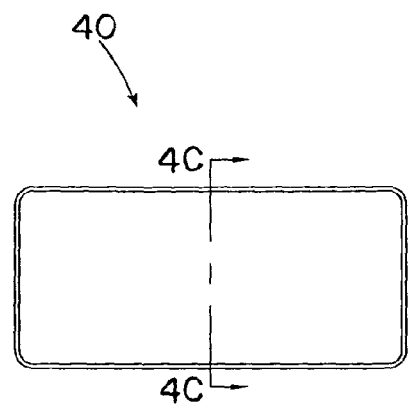
FIG. 4B is a front elevational view of the cavity liner of FIG. 4A.
Figure 4C:
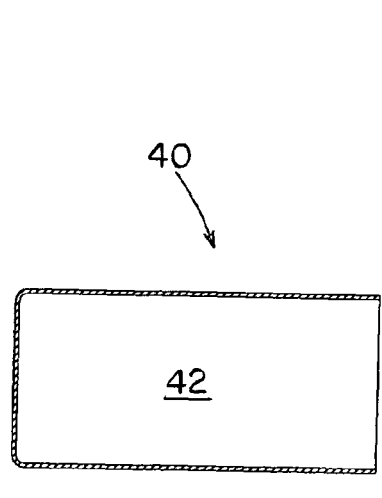
FIG. 4C is a transverse cross-section of the cavity liner taken along the section line 4C-4C of FIG. 4B.
Figure 4D:
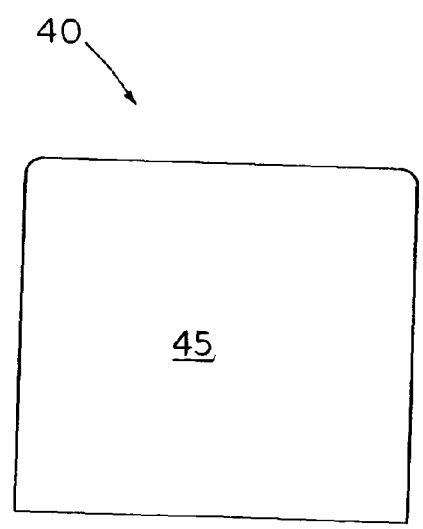
FIG. 4D is a top plan view of the cavity liner of FIG. 4A.
Figure 5A:
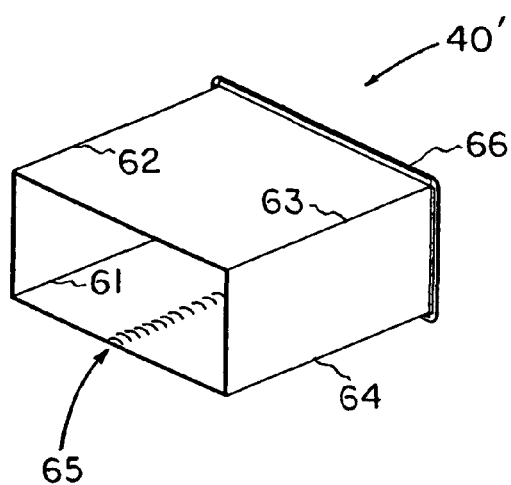
FIG. 5A is a perspective view of another embodiment of a cavity liner in accordance with the present invention.
Figure 5B:
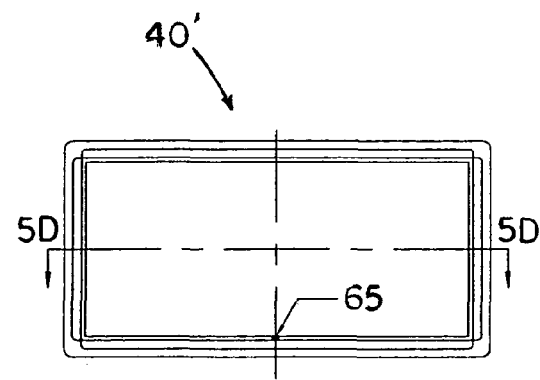
FIG. 5B is a front elevational view of the cavity liner of FIG. 5A.
Figure 5C:
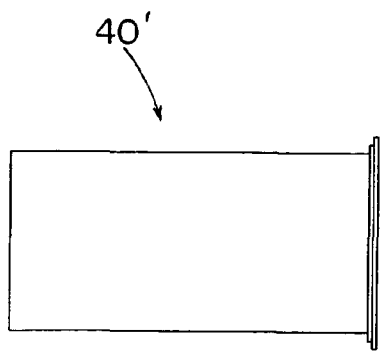
FIG. 5C is a side elevational view of the cavity liner of FIG. 5A.
Figure 5D:
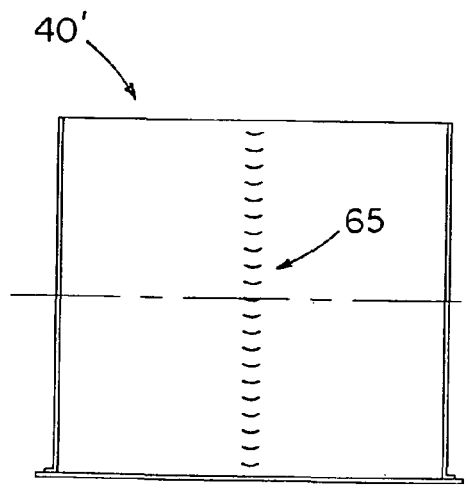
FIG. 5D is a top plan view of the cavity liner of FIG. 5A.
Figure 6A:
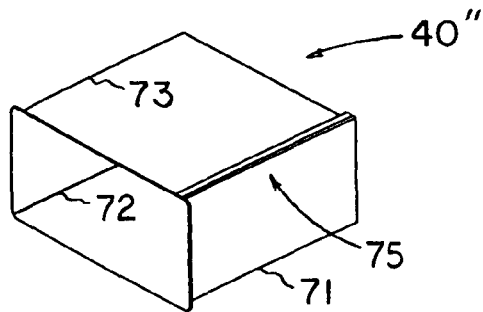
FIG. 6A is a perspective view of another embodiment of a cavity liner in accordance with the present invention.
Figure 6B:
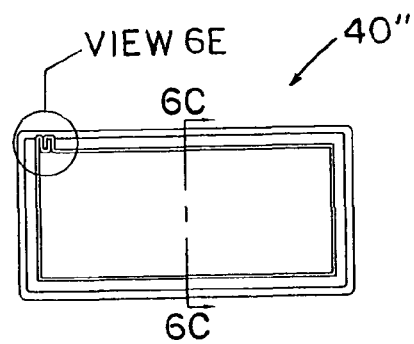
FIG. 6B is a front elevational view of the cavity liner of FIG. 6A.
Figure 6C:
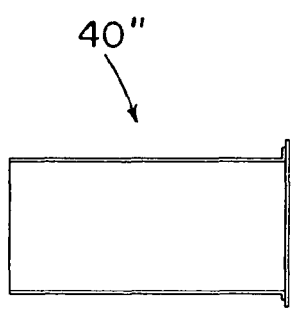
FIG. 6C is a side elevational view of the cavity liner of FIG. 6A.
Figure 6D:
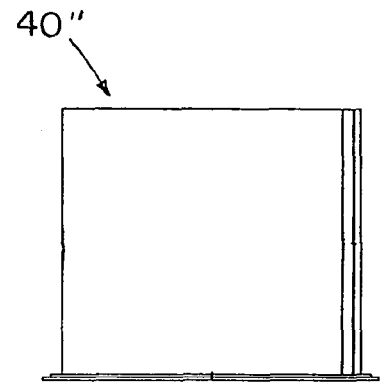
FIG. 6D is a top plan view of the cavity liner of FIG. 6A.
Figure 6E:
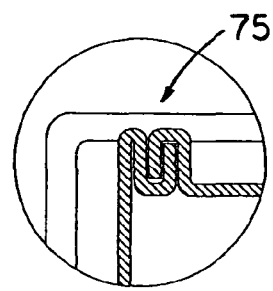
FIG. 6E is an enlarged detail view taken from FIG. 6B showing the fold and lock seam construction.

FIG. 3B is a schematic representation of the electrical components and circuitry of the embodiment of the toaster oven 10 illustrated in FIG. 3A.

Figure 7:
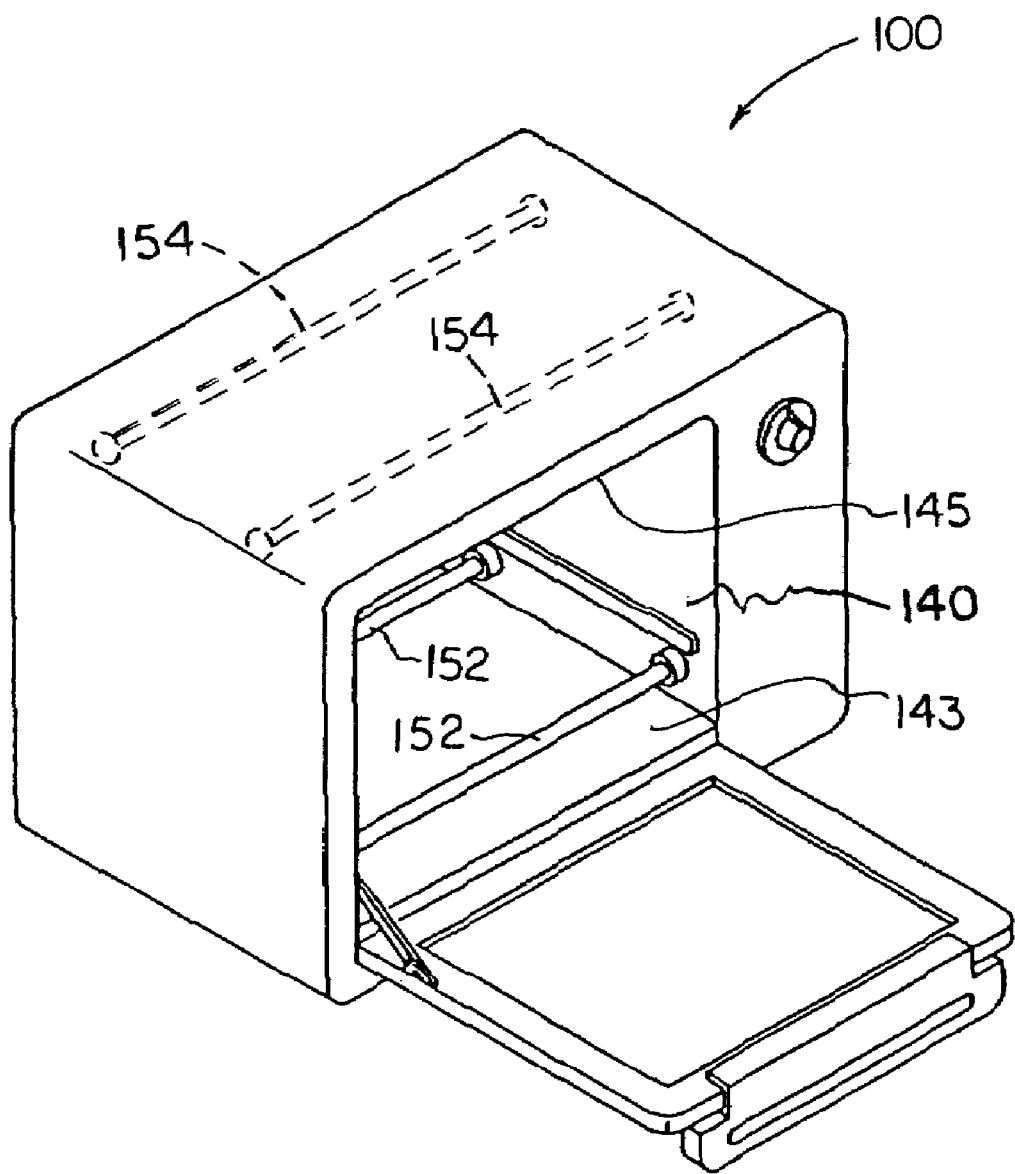
FIG. 7 is a perspective view of a toaster oven of the Prior Art with CALROD heating elements.

For purposes of comparison a toaster oven 100 of the prior art is illustrated in FIG. 7. In the prior art example tubular heating elements 152, 154 manufactured under the tradename, CALROD, are utilized in pairs as shown. Such heating elements 152, 154 are typically disposed in parallel and positioned in spaced-apart relation to the floor 143 and ceiling 145 of the oven cavity 140. CALROD heating elements 152, 154 are typically comprised of stainless steel tubing, which encloses a resistance heating wire (not shown). Such CALROD heating elements 152, 154 are known in the appliance industry to be relatively inefficient due to their tubular construction, which radiates heat outwardly in all directions resulting in a substantial loss of heat energy. This results in longer cooking cycles for common food items when compared to the heating means of the present invention.

Figure 8A:
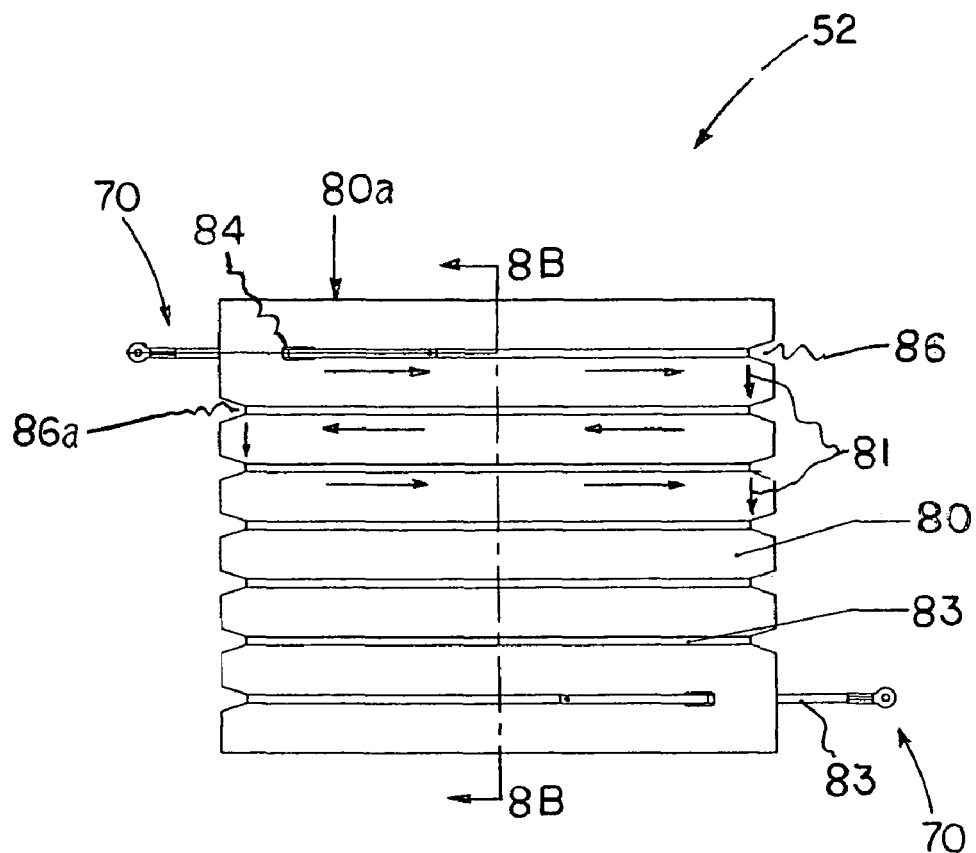
FIG. 8A is a top plan view of one embodiment of a heating element in accordance with the present invention.

With reference to FIGS. 8A-10B, the present invention provides structures, which comprise heating means including, but not limited to, the following structures. As illustrated in FIG. 8A heating elements 52 and 54 are constructed as layered assemblies wherein a heat insulating board 80 such as mica insulation board or other similar material is utilized as a core member of the heating element. Since the physical and chemical properties of mica insulation board and other similar heat insulating materials are well known to those skilled in the art, further detailed discussion of this material is not deemed necessary.

Referring to FIG. 8A, it will be noted that heat-insulating board 80 is fabricated with a plurality of die-cut notches 86 and 86a, which are formed at predetermined intervals along the opposite lateral edges thereof. Using a construction method of the present invention illustrated in FIG. 8A, a single-sided heating element 52 or 54 is produced by initially inserting heater wire 83 through an opening 84 in a first end 80a of insulation board 80 and drawing heater wire across the insulation board to a first notch 86 as shown. Next, wire 83 is interlaced between adjacent first and second notches 86 on the same lateral edge of the insulation board 80 (as shown by directional arrows 81). Thereafter, heater wire 83 is again drawn across board 80 to the first opposed notch 86a on the opposite lateral edge thereof. Next, wire 83 is interlaced between first and second adjacent notches 86a on the opposite lateral edge of the insulation board 80.

In this manner it will be understood that a single-sided heating element 52, 54 may be produced. Such a heating element 80 (FIG. 8A) is advantageous in that approximately 75% of heater wire 83 is positioned on the side of the heating element facing the food item to be cooked in the toaster oven 10. The heat loss inherent in the CALROD heating elements 152, 154 of the prior art (FIG. 7) is substantially overcome by the single-sided, low-profile construction of the present heating elements 52, 54. Further, the single-sided surface area of heating elements 52, 54 is calculated to cover a predetermined surface area equal to at least 25% of the total surface of the top and bottom surfaces 45, 43 respectively of cavity liner 40. Such calculated surface area of heating elements 52, 54 is designed to ensure efficient use of heat energy within the cooking chamber.

It will also be appreciated by those skilled in the art that the low profile construction of heating elements 52, 54 and their placement in close proximity to cavity liner 40 also provides an increase in the usable space within oven 10. The present heating elements 52, 54 also provide more uniform heating within the oven due to their flattened configuration and increased surface area in comparison to tubular (i.e. CALROD) heating elements 152, 154.

Although not preferred due to their inherent disadvantages, it will be appreciated by those skilled in the art that such CALROD heating elements 152, 154 can be utilized in combination with specific features of the present invention to improve upon such prior art heating elements as described hereinbelow in further detail.

Figure 9A:
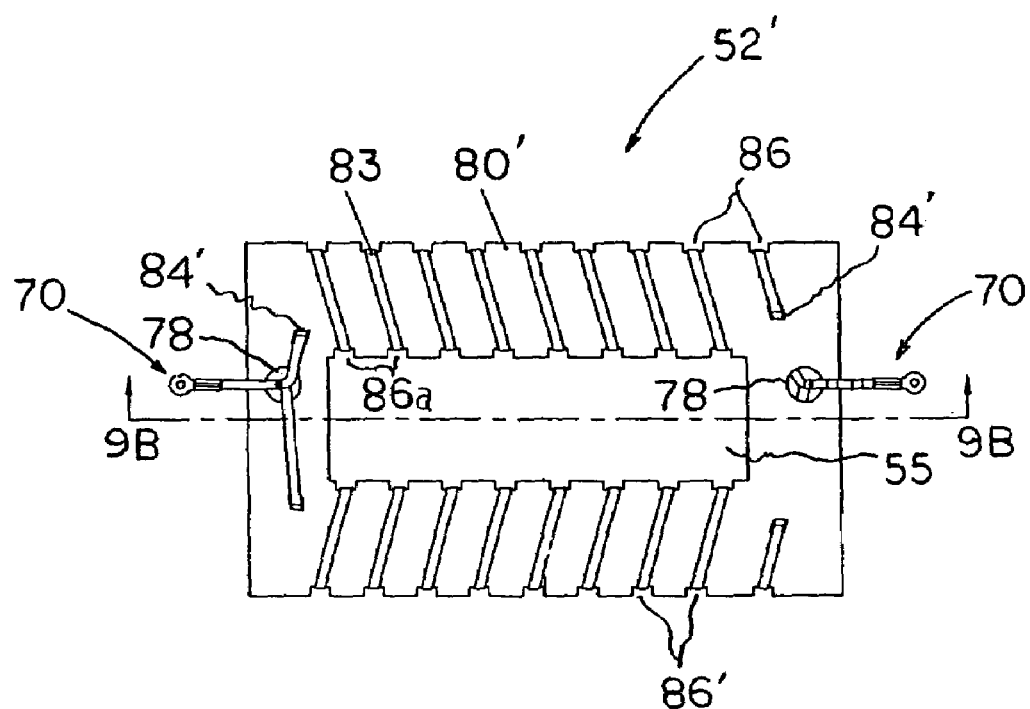
FIG. 9A is a top plan view of another embodiment of a heating element having a center opening in accordance with the present invention.
Figure 9B:
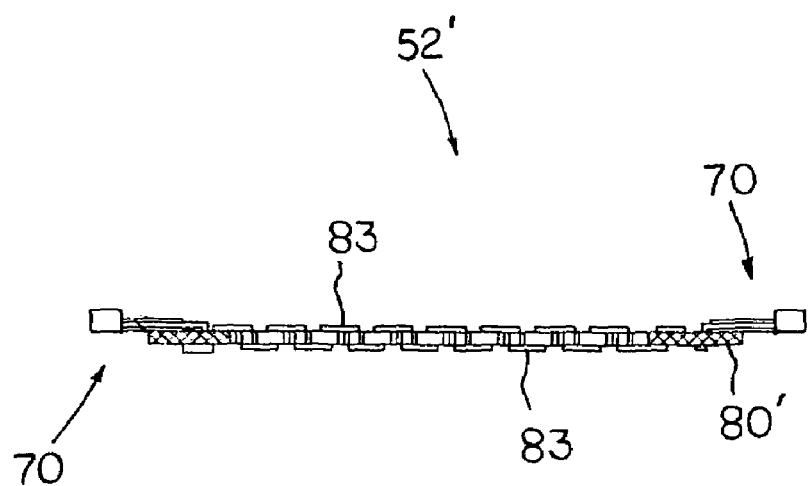
FIG. 9B is a cross-sectional view taken along section line 9B-9B of FIG. 9A.

Using an alternative construction method of the present invention, a double-sided heating element 52' having a center opening 55 as shown in FIG. 9A is provided. In this embodiment it will be noted that a mica insulation board 80' including center opening 55 also includes a plurality of die cut notches 86 which are formed at predetermined intervals along the opposite lateral edges of insulation board. Further, it can be seen that a plurality of die cut notches 86a are formed at intervals around the opposite lateral edges of center opening 55 as shown.

In this construction method heater wires 83 are inserted through openings 84' and drawn across insulation board 80' to a first a pair of opposed notches 86, 86a as shown. Next, heater wires 83 are drawn across insulation board 80' to a first pair of notches 86 and wrapped in continuous revolutions around the insulation board 80' being inserted through opening 55 with each revolution, and advanced in this manner between diagonally opposed pairs of notches 86, 86a along the entire length thereof and on both sides of the board 80' in the configuration shown Thereafter, the terminal ends of each length of wire 83' are soldered and attached as at 78 to a lead wire assembly 70 as illustrated in FIG. 9A.

Figure 10A:
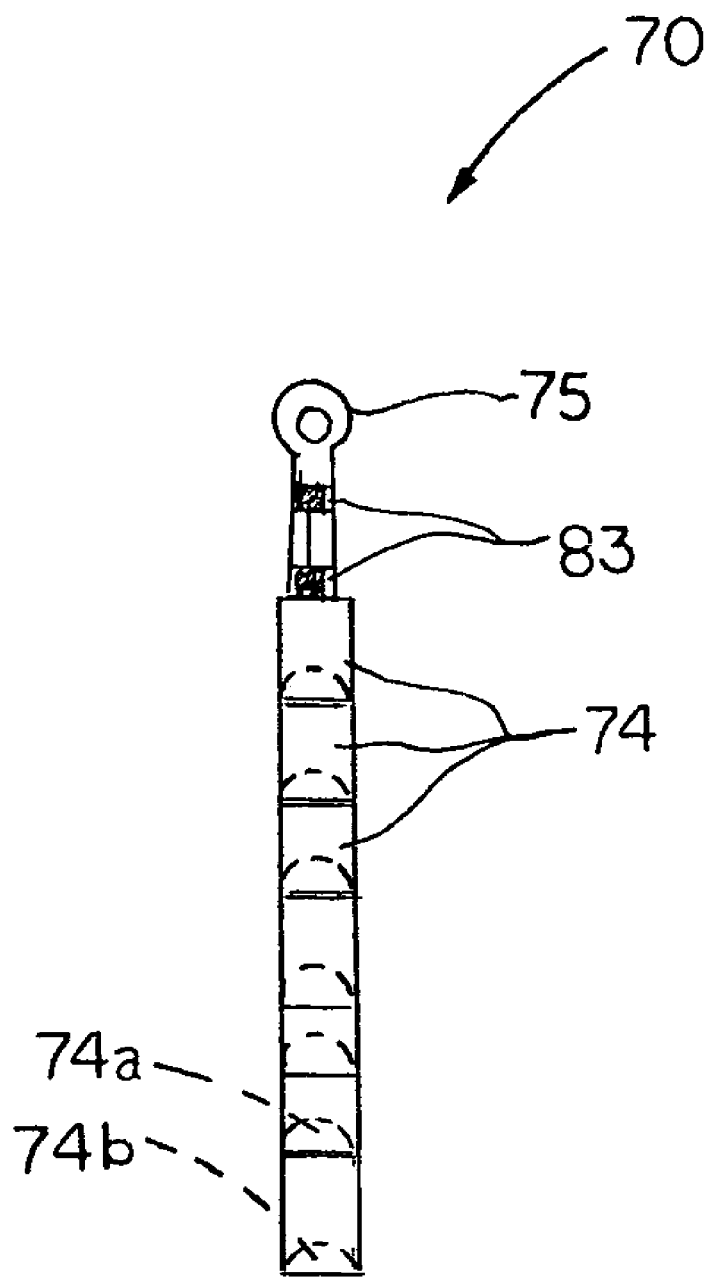
FIG. 10A is a plan view of a wire lead assembly for the heating element of the present invention.

Referring to FIG. 10A there is shown a heater lead wire assembly, indicated generally at 70, for installation on the terminal end of the heater wire 83. In this embodiment the terminal ends of heater wires 83 are insulated by a plurality of ceramic sleeves 74 to shield the temperature control 17 from exposure to heat generated by wire 83. It can be seen that each ceramic sleeve 74 includes a convex tip 74a (shown in broken line) which engages a concave end 74b on the adjacent sleeve to impart flexibility to the wire lead assembly. A terminal loop connector 75 is applied to the end of each heater lead wire assembly 70 as illustrated.

Figure 10B:
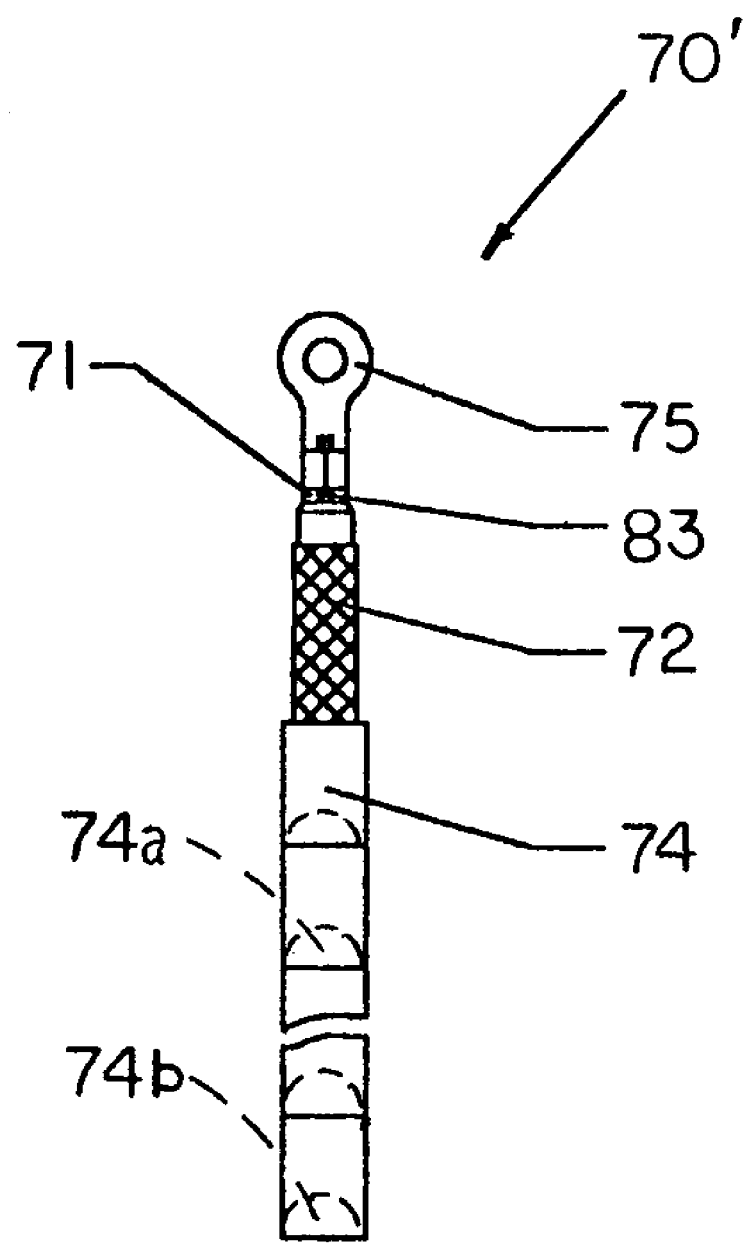
FIG. 10B is a plan view of another embodiment of a wire lead assembly for the heating element of the present invention.

In an alternative construction of the heater lead wire assembly, indicated generally at 70', in FIG. 10B the terminal ends of the heater wire 83 are tightly twisted with a bundle of nickel conductors 71 or other suitable conductors to create a heat sink, which effectively insulates the heater wires 83 from the cooking controls and circuitry. Further, the twisted bundle of nickel conductors 71 and heater wire 83 is covered with a fiberglass insulation sleeve 72 and insulated by the same ceramic sleeves 74 to insure that the temperature and function controls are accurate and not influenced by their proximity to the heating elements 52, 54. A terminal loop connector 75 is applied to the terminal end of the heater lead wire assembly 70' as described hereinabove.

Figure 11A:
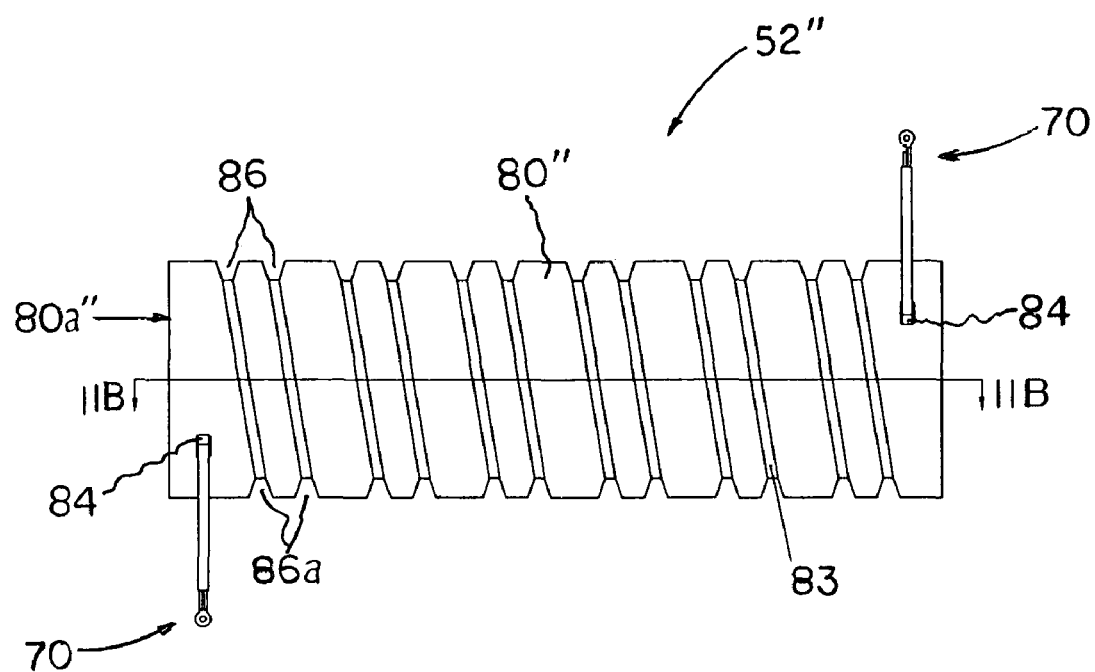
FIG. 11A is a top plan view of another embodiment of a belt heating element in accordance with the present invention.

In another embodiment a belt heating element 52" as shown in FIG. 11A is fabricated by utilizing another method of the present invention. Heating element 52" is also constructed as a layered assembly wherein an elongated strip of mica insulation board 80" is provided including a plurality of die cut notches 86, 86a formed in a predetermined pattern at intervals along the lateral edges thereof. Using a technique similar to that described with regard to FIGS. 9A-9B, heater wire 83 is inserted through opening 84 at a first end 80a" of insulation board 80", drawn across pairs of diagonally opposed notches 86, 86a, and wrapped in continuous revolutions along the entire length thereof as shown. It will be appreciated that using the aforementioned technique produces a double-sided heating element 52" having a heater wire 83 disposed on either side thereof. In a similar manner a wire lead assembly 70 is attached at both ends of heater wire 83 as shown in FIG. 11A.

Figure 8B:
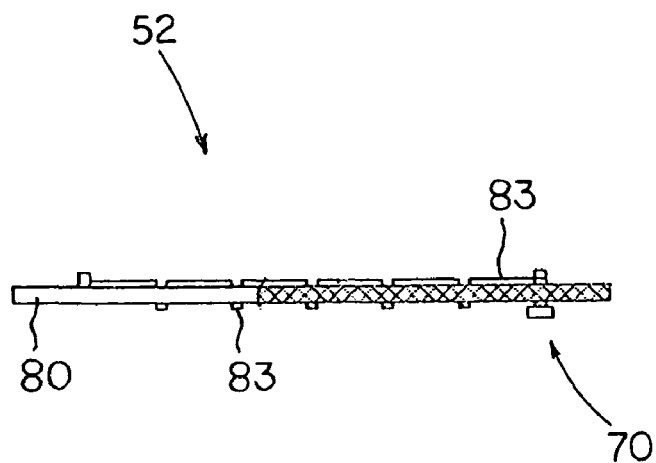
FIG. 8B is a cross-sectional view taken along section line 8B-8B of FIG. 8A.

A single-sided belt heating element (not illustrated) is produced using the wire wrapping technique described hereinabove with regard to FIGS. 8A-8B. It will be appreciated that such a single-sided belt heating element is advantageous in improving heater efficiency and for providing a cooler outer surface to housing 20 in the event of user contact during operation.

Figure 12A:
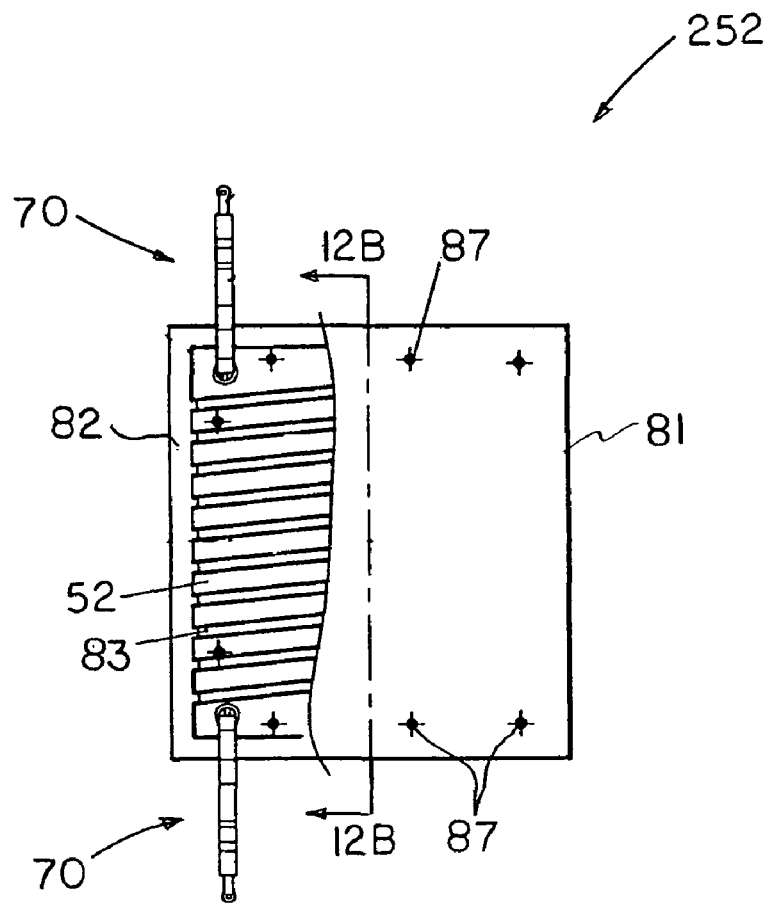
FIG. 12A is a partially cutaway plan view showing one embodiment of a heating element of the present invention in a sheathed configuration.
Figure 12B:
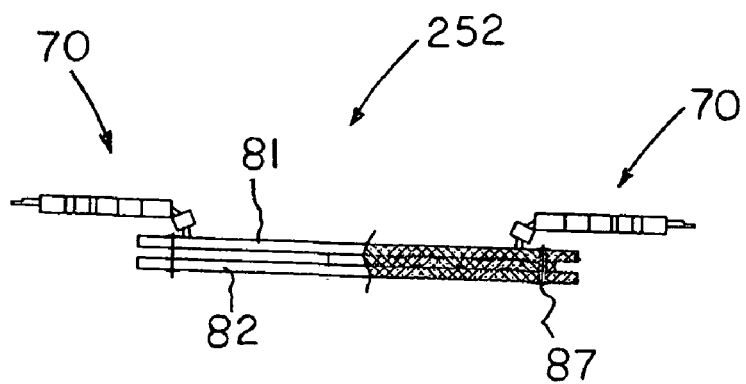
FIG. 12B is a cross-sectional view taken along section line 12B-12B of FIG. 12A.

In accordance with the present invention each of the aforementioned heating elements 52, 52', 52" is provided in various sheathed configurations to protect heater wire 83 from damage as necessary for a particular application of the present oven. In such configurations heating elements 52, 52', 52" are captured between opposed layers of suitable materials using various techniques. With reference to FIGS. 12A-12B, there is shown an embodiment wherein a heating element 52 constructed as described hereinabove is permanently captured between two opposed layers 81, 82 of flexible mica sheet or other suitable heat insulating material to produce a sheathed heating element assembly, indicated generally at 252. Opposed layers 82, 84 are secured at periodic intervals by rivets 87 during assembly to maintain alignment of the assembled layers. In this embodiment a heater wire assembly 70 is also attached at either end of heater wire 83 as shown.

Figure 13A:
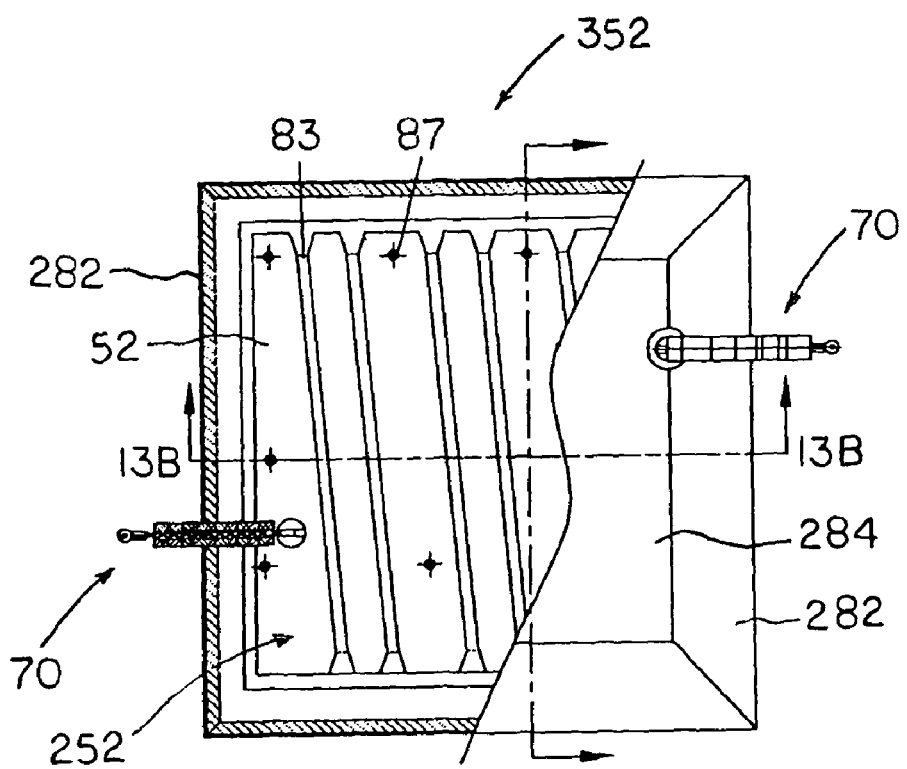
FIG. 13A is a partially cutaway plan view showing another embodiment of a heating element in a sheathed configuration.
Figure 13B:
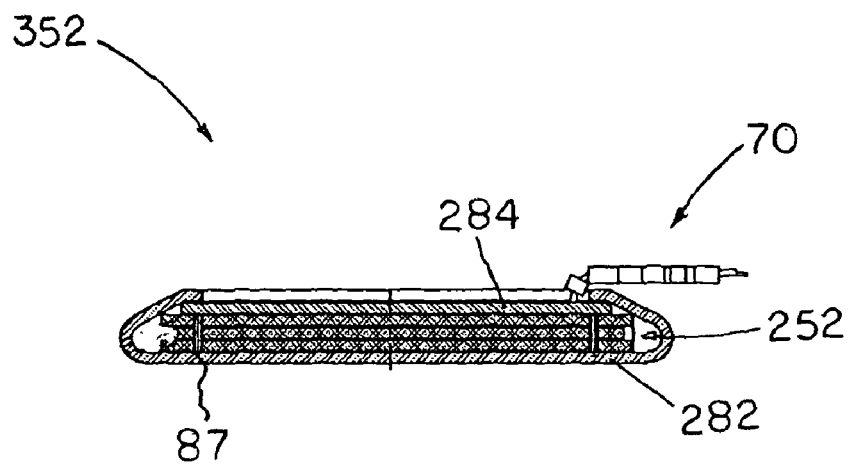
FIG. 13B is a cross-sectional view taken along section line 13B-13B of FIG. 13A.

Referring now to FIGS. 13A-13B there is shown another embodiment wherein the sheathed heating element assembly 252 shown in FIGS. 12A-12B is further encased in a metallic sheathing assembly, indicated generally at 352, comprised of interlocking members 282, 284 respectively made of light gauge sheet metal such as steel or aluminum, which are folded about heating element assembly 252. The heat conductive members 282, 284 provide increased durability and convenience in cleaning. In this embodiment a heater wire assembly 70 is also attached at either end of heater wire 83 as illustrated.

Figure 14A:
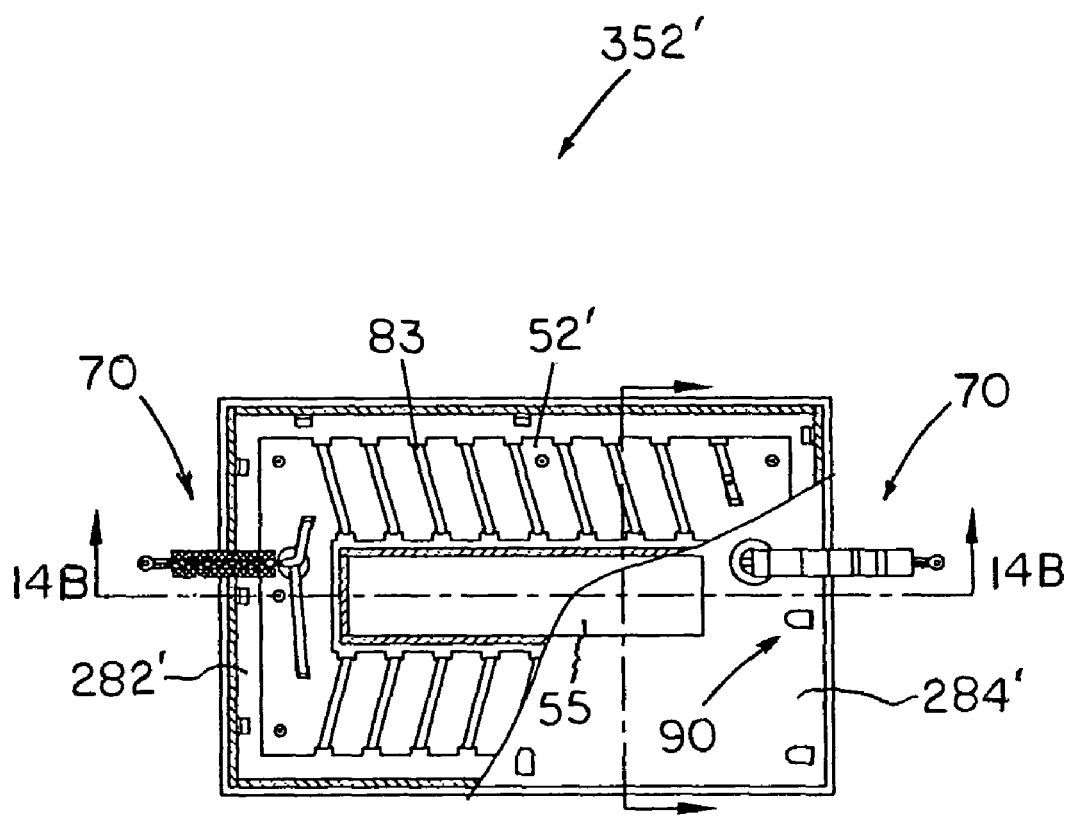
FIG. 14A is a partially cutaway plan view showing another embodiment of a heating element in a sheathed configuration.
Figure 14B:
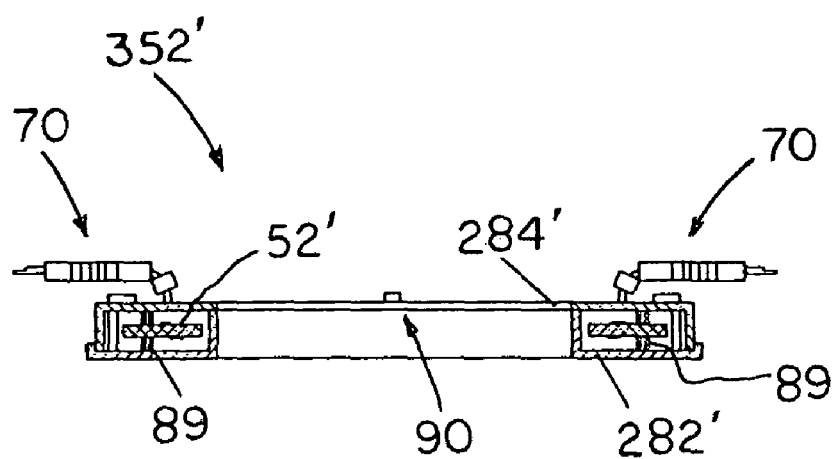
FIG. 14B is a cross-sectional view taken along section line 14B-14B of FIG. 14A.

Referring to FIGS. 14A-14B heating element 52' (FIGS. 9A-9B) can be further encased in a metallic sheathing assembly, indicated generally at 352', comprised of interlocking members 282', 284' respectively made of light gauge sheet metal such as steel or aluminum, which are installed about heating element 52'. In the embodiment shown a commonly known bent tab and slot fastening system as at 90 is utilized to secure members 282', 284' in the position shown. Ceramic spacers 89 are provided to maintain the heating element 52' in spaced apart relation to interlocking members 282', 284' respectively. Heat conductive members 282', 284' provide increased durability and convenience in cleaning for this assembly.

Figure 11B:
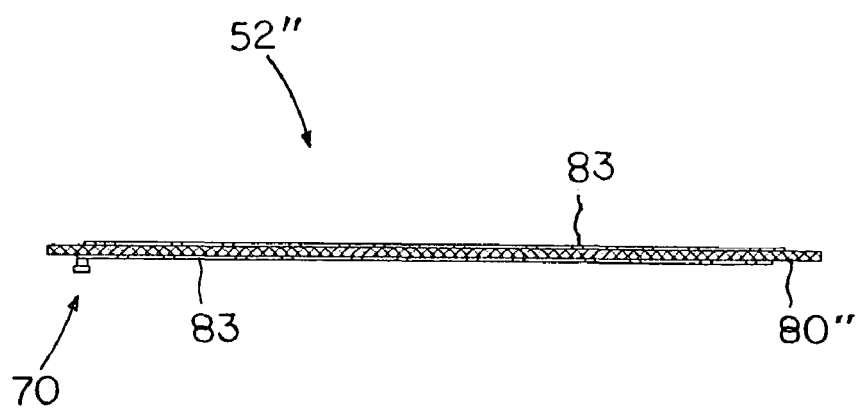
FIG. 11B is a cross-sectional view taken along section line 11B-11B of FIG. 11A.
Figure 15A:
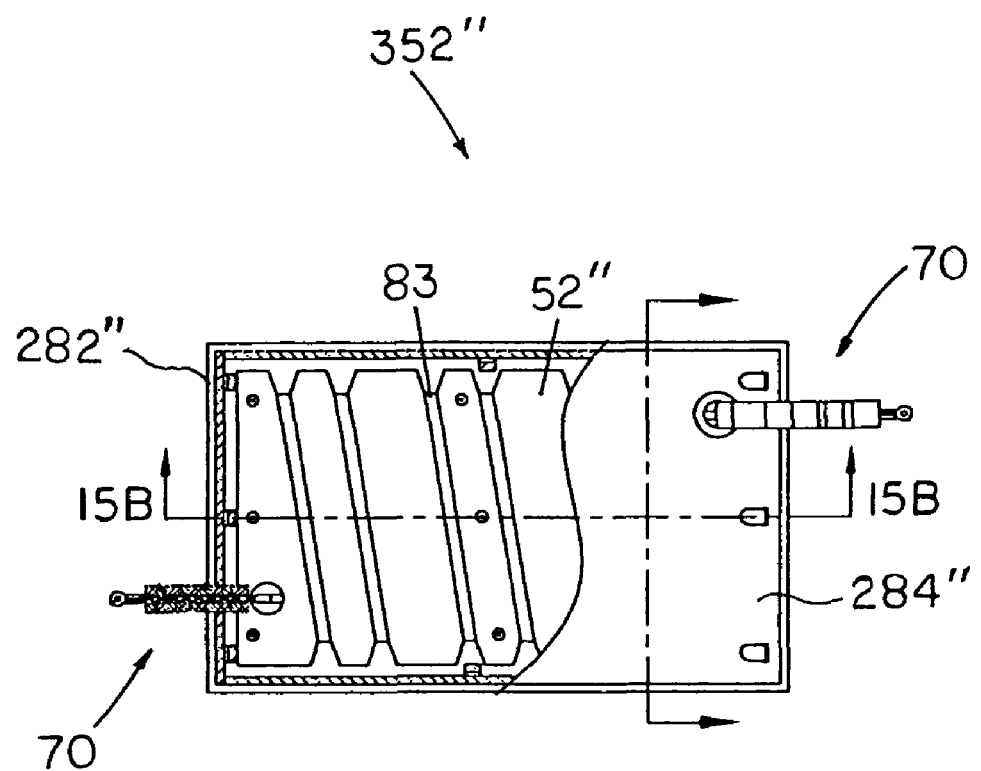
FIG. 15A is a partially cutaway plan view showing another embodiment of a heating element in a sheathed configuration.
Figure 15B:
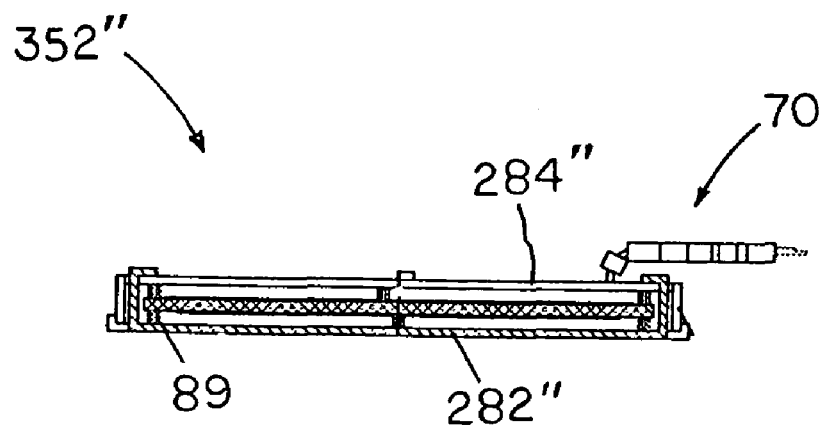
FIG. 15B is a cross-sectional view taken along section line 15B-15B of FIG. 15A.

Referring to FIGS. 15A-15B belt heating element 52" (see FIGS. 11A-11B) can be further enclosed in a metallic sheathing assembly, indicated generally at 352", comprised of interlocking members 282", 284" respectively made of light gauge sheet metal such as steel or aluminum which are installed about heating element 52". In the embodiment shown a bent-tab and slot fastening system as at 90 (more clearly shown in FIG. 16A) is also utilized to secure members 282", 284" in the position during assembly. The heat conductive members 282", 284" also provide increased durability and convenience in cleaning. In this embodiment a heater wire assembly 70 is also attached at either end of heater wire 83 as shown.

Figure 16B:
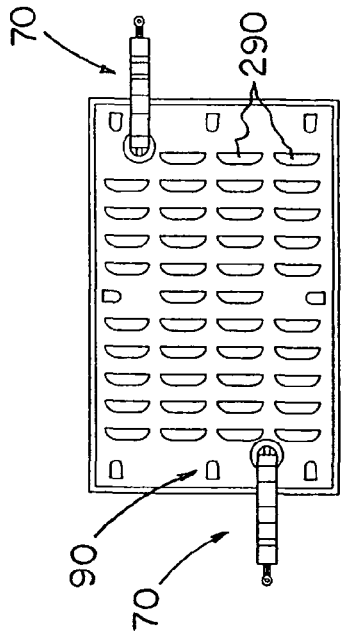
FIG. 16B is a top plan view of a heating element enclosed in a sheath having louvered openings.
Figure 16D:
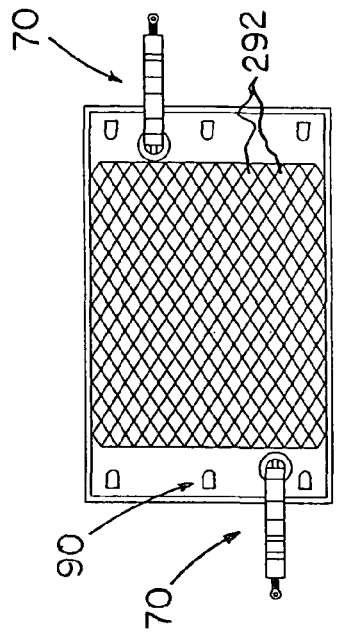
FIG. 16D is a top plan view of a heating element enclosed in a sheath having screen mesh openings.
Figure 16A:
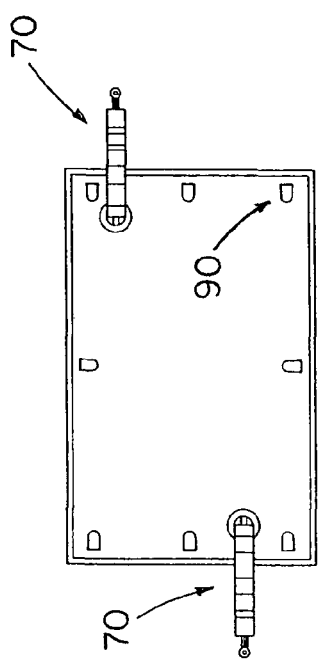
FIG. 16A is a top plan view of a heating element enclosed in a plain sheath.
Figure 16C:
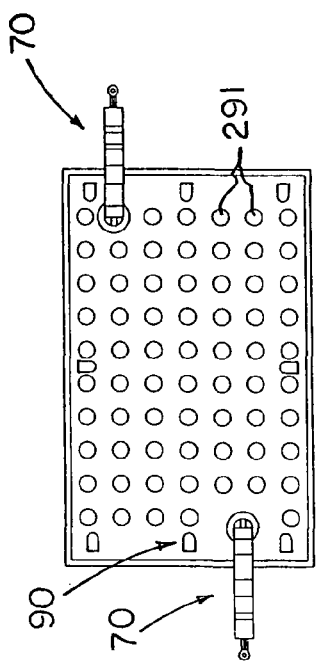
FIG. 16C is a top plan view of a heating element enclosed in a sheath having circular perforate openings.

In addition to a plain sheet metal construction of interlocking members 282, 284, 282', 284' and 282", 284" described hereinabove, such members are also provided in modified configurations as illustrated in FIGS. 16B-16D each having a plurality of perforations formed therein for dispersion of heat energy. Such modified configurations for interlocking members 282, 284, 282', 284' and 282", 284" include louvered openings 290 (FIG. 16B), circular openings 291 (FIG. 16C), and screen mesh openings 292 (FIG. 16D). It will be appreciated that each interlocking member 282, 284, 282', 284' and 282", 284" may include such openings 290, 291, 292 formed on either interlocking member of a sheathed assembly 352, 352', 352" corresponding to the construction of the heating element 52, 52', 52'a encased therein (i.e. single-sided or double-sided construction). In this manner heater wire 83 is always positioned adjacent to openings 291, 292, 293 in such modified configurations (FIGS. 16B-16D) to efficiently transfer heat energy from the sheathed heating element to a food item being cooked in the toaster oven.

Figure 17A:
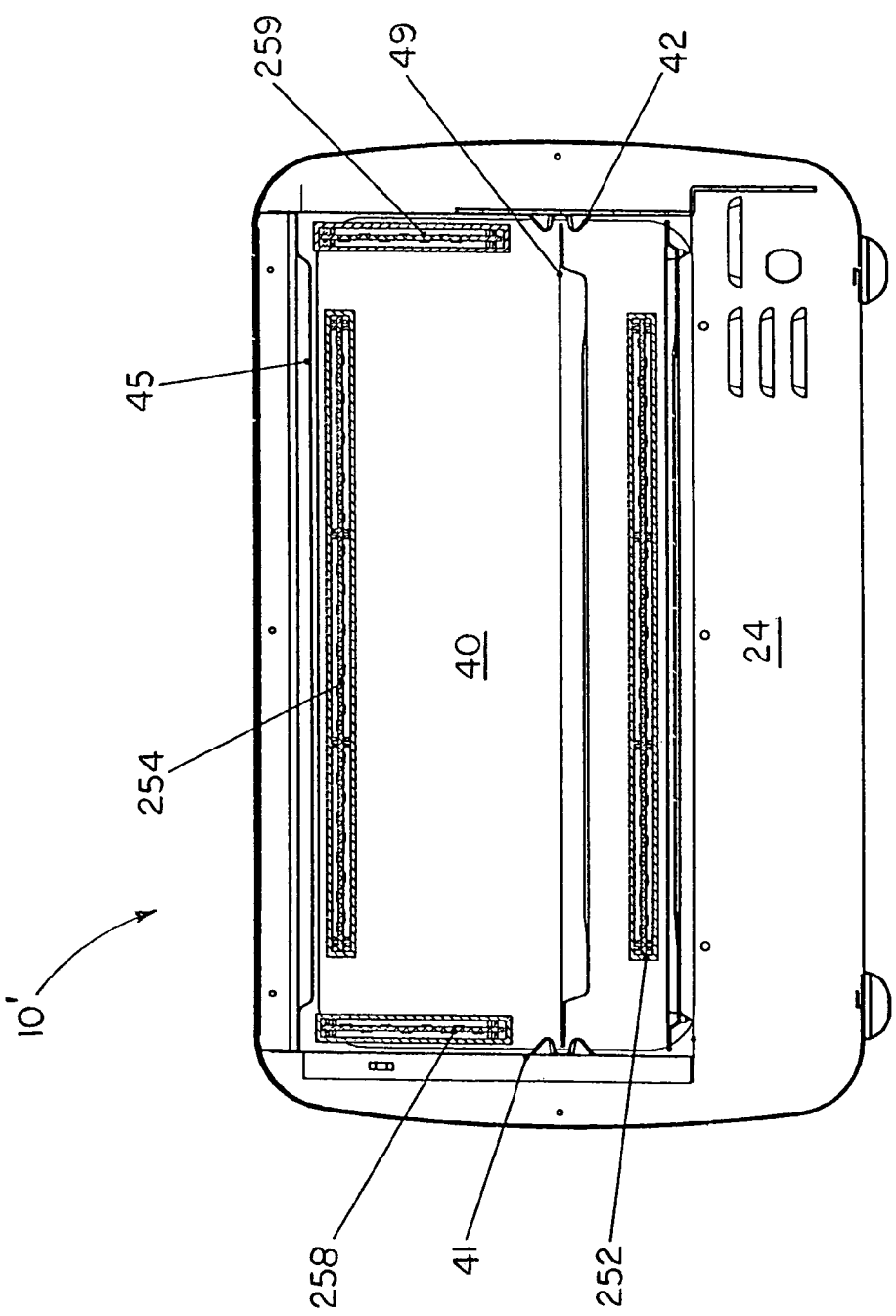
FIG. 17A is a longitudinal cross-section of another embodiment of the present toaster oven illustrating upper, lower, and side-mounted heating elements.

Referring now to FIG. 17A there is shown therein another embodiment of the present toaster oven 10' including upper and lower heating elements 252, 254 and side-mounted heating elements 258, 259 respectively. It will be appreciated that side-mounted heating elements 258, 259 are installed in fixed positions in close proximity to sidewalls 41, 42 of cavity liner 40. Side-mounted heating elements 258, 259 are substantially similar in their low-profile construction to heating elements 52, 54 hereinabove.

Figure 17B:
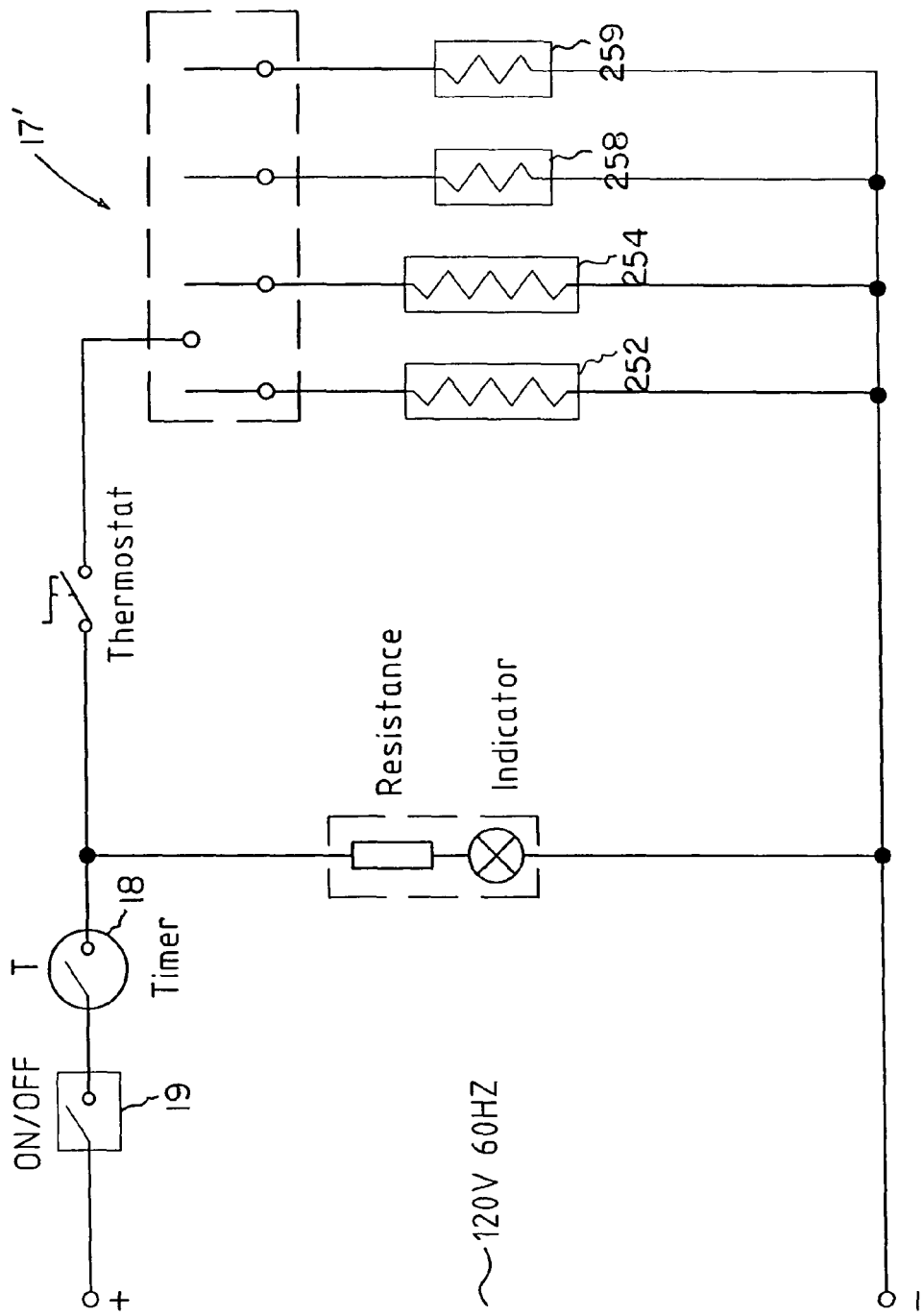
FIG. 17B is a schematic representation of the electrical components and circuitry of the embodiment of the present toaster oven shown in FIG. 17A.

FIG. 17B is a schematic representation of the electrical components and circuitry of the embodiment of the toaster oven 10' illustrated in FIG. 17A. It will be noted that the electrical circuitry is modified in this version of the heater control mechanism 17' to accommodate the electrical interconnection of the heating elements 258, 259 in this embodiment as shown in FIG. 17B. The electrical functions of this embodiment may be carried out by standard electromechanical controls as described hereinabove or, in the alternative, may be carried out by an electronic control panel 120 including a touch screen interface 120a with an integrated control circuit board 122 (see FIGS. 25 and 27).

Figure 18:
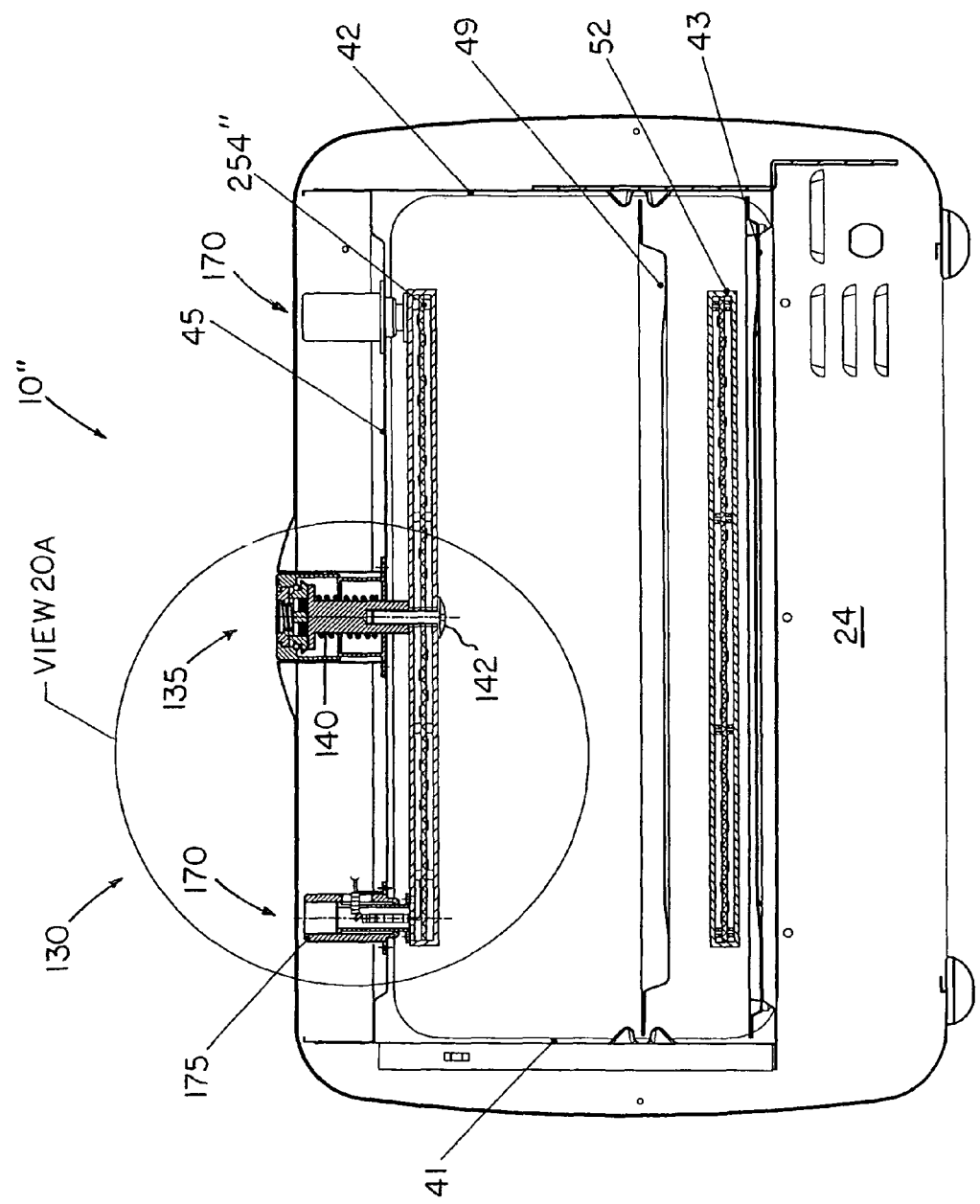
FIG. 18 is a longitudinal cross-section of another embodiment of the present toaster oven wherein the upper heating element is adapted for vertical shifting movement.

In another embodiment the present toaster oven 10" provides structures comprising heater shifting means including, but not limited to, the following structures. As shown in FIG. 18, toaster oven 10" is provided with a shifting mechanism, indicated generally at 130, for shifting upper heating element 254" into closer proximity with a food item (not shown) disposed on oven pan 49. Heater shifting mechanism 130 includes a shift-button assembly, indicated generally at 135, and shift guide assemblies, indicated generally at 170, which provide for guided vertical movement of the upper heating element 254" during its vertical travel as hereinafter explained.

Shift-button assembly 135 is a spring-actuated device comprised of a plunger 140 that is attached to the upper heating element 254" by a machine screw 142, which is received in a mating threaded hole 143 formed in plunger 140. As more clearly shown in FIG. 19A a compression spring 144 is radially disposed about plunger 140, which protrudes through lower plunger housing 145b and extends through cavity liner 40 into the cooking chamber of the present oven 10". Spring 144 is captured between lower plunger housing 145b and a perpendicular flange 140a formed on plunger 140 to spring bias the upper heating element 254" to a fully retracted position in close proximity to top surface 45 of the cavity liner 40 as most clearly shown in FIG. 20A.

Figure 19A:
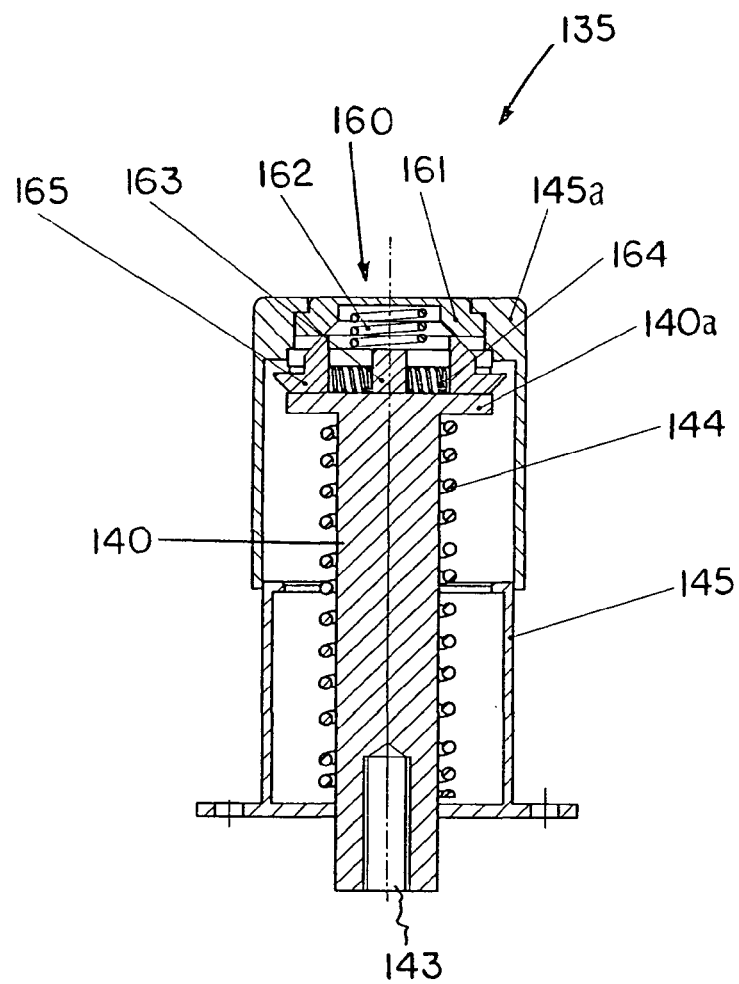
FIG. 19A is an enlarged cross-section view of the shift button assembly showing the components thereof.
Figure 19B:
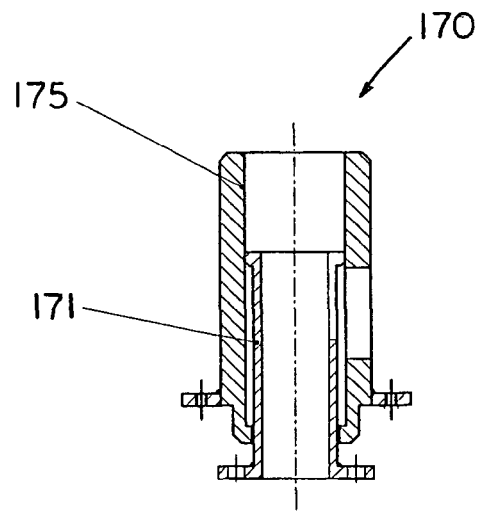
FIG. 19B is an enlarged cross-section view of a shift guide assembly showing details thereof.

Shift button assembly 135 located in the upper plunger housing 145a further includes a locking mechanism, indicated generally at 160, which comprises a cover button 161, a first spring 162, a center plug 163, a second spring 164, and a sliding block 165 assembled as shown in FIG. 19A.

Figure 20A:
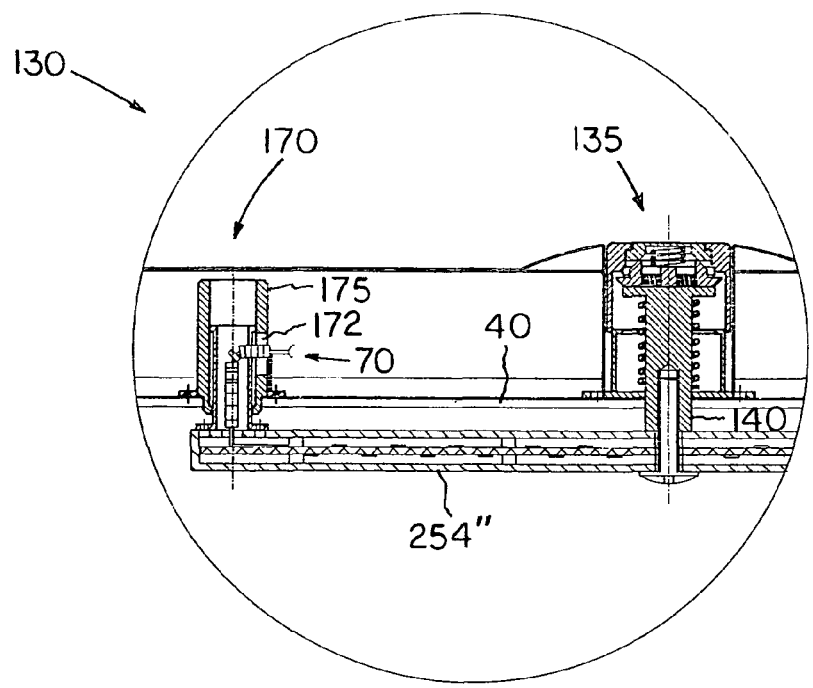
FIG. 20A is an enlarged detail view of the heater shifting mechanism in a fully retracted position.
Figure 20B:
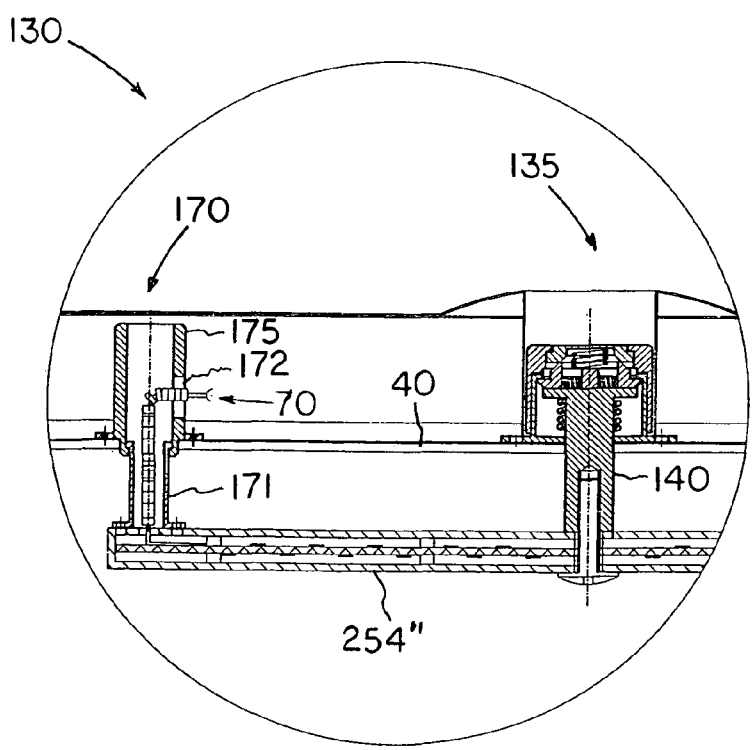
FIG. 20B is an enlarged detail view of the heater shifting mechanism in a fully extended position.

In order to shift the upper heating element 254" downwardly to the fully extended position (FIG. 20B), button 161 is depressed to overcome the force of spring 144 using manual pressure which releases sliding blocks 165 from an unlocked position shown in FIG. 20A and sliding blocks are biased outwardly by second spring 164 into engagement with an inner surface of upper plunger housing 145a as shown in FIG. 20B.

When button 161 is released while in the fully extended position (FIG. 20B), the locking mechanism 160 is engaged in this position against the force of spring 144. When the heating element 254" is in this fully extended position, the cooking cycle required to toast food items such as sliced bread, bagels, or pizza is substantially reduced in comparison to a conventional toaster oven 100 (FIG. 7).

If the button 161 is again depressed while in the fully extended position (FIG. 20B), sliding blocks 164 are disengaged and plunger 140 is forced upwardly by the force of compression spring 144 raising heating element 254" back to a fully retracted position (FIG. 20A).

A pair shift-guiding assemblies, indicated generally at 170, are provided to guide the vertical travel of heating element 254" to prevent binding. Guide assemblies 170 are each comprised of tubular guide members 171, which are attached to movable heating element 254" by fasteners (not shown). Guide members 171 are received in tubular guide tracks 175, which are mounted on cavity liner 40 as shown in FIGS. 20A-20B to provide sliding vertical movement of the heating element 254".

It will be noted that each wire lead assembly 70 attached to heating element 254" passes through a slot 172 (FIGS. 20A-20B) formed in its corresponding guide track 175. Slots 172 accommodate the flexion of heater wire assemblies 70 during vertical shifting movement of the heating element 254" from the retracted position (FIG. 20A) to the fully extended position (FIG. 20B) illustrated.

Figure 21A:
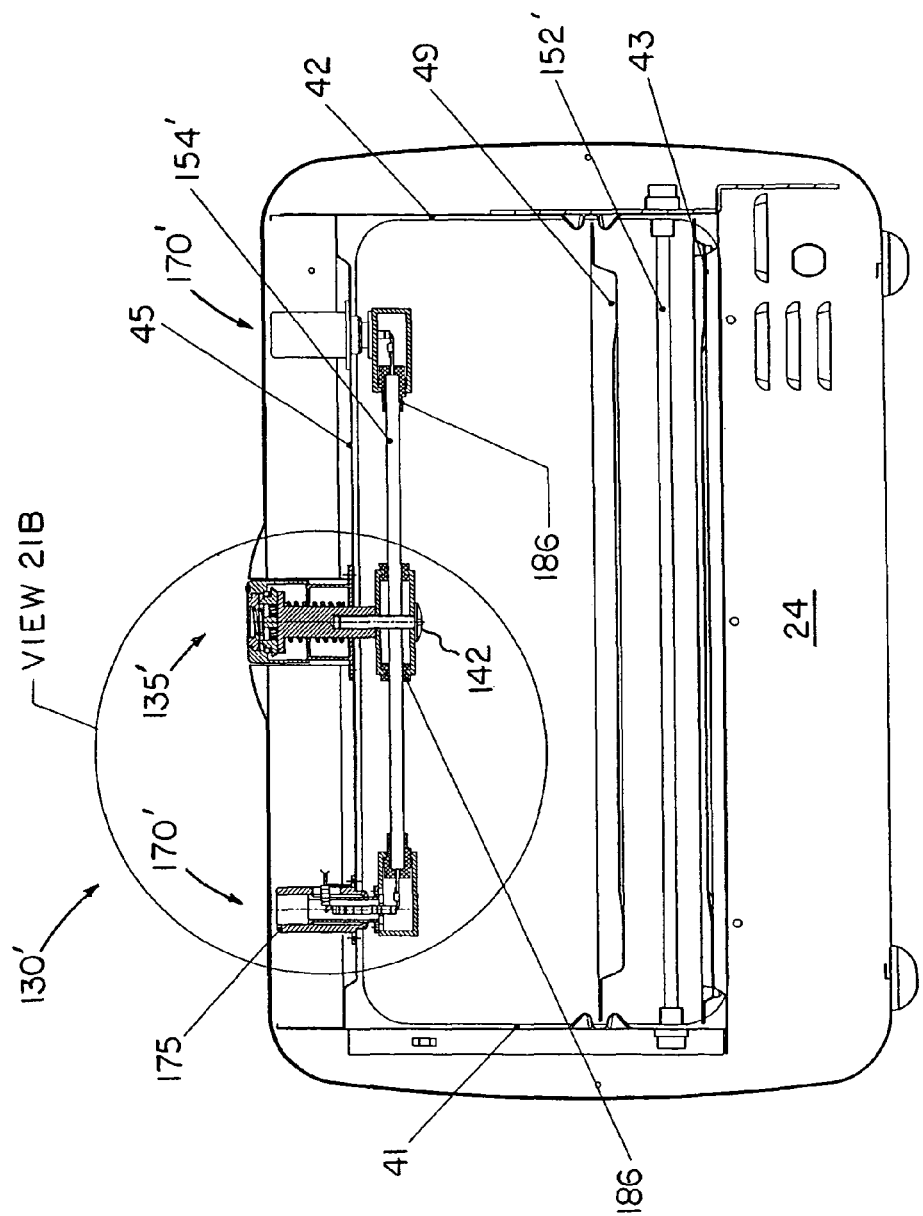
FIG. 21A is a longitudinal cross-section of another embodiment of the present toaster oven wherein a CALROD heating element is adapted for use with the heater shifting mechanism of the present invention.
Figure 21B:
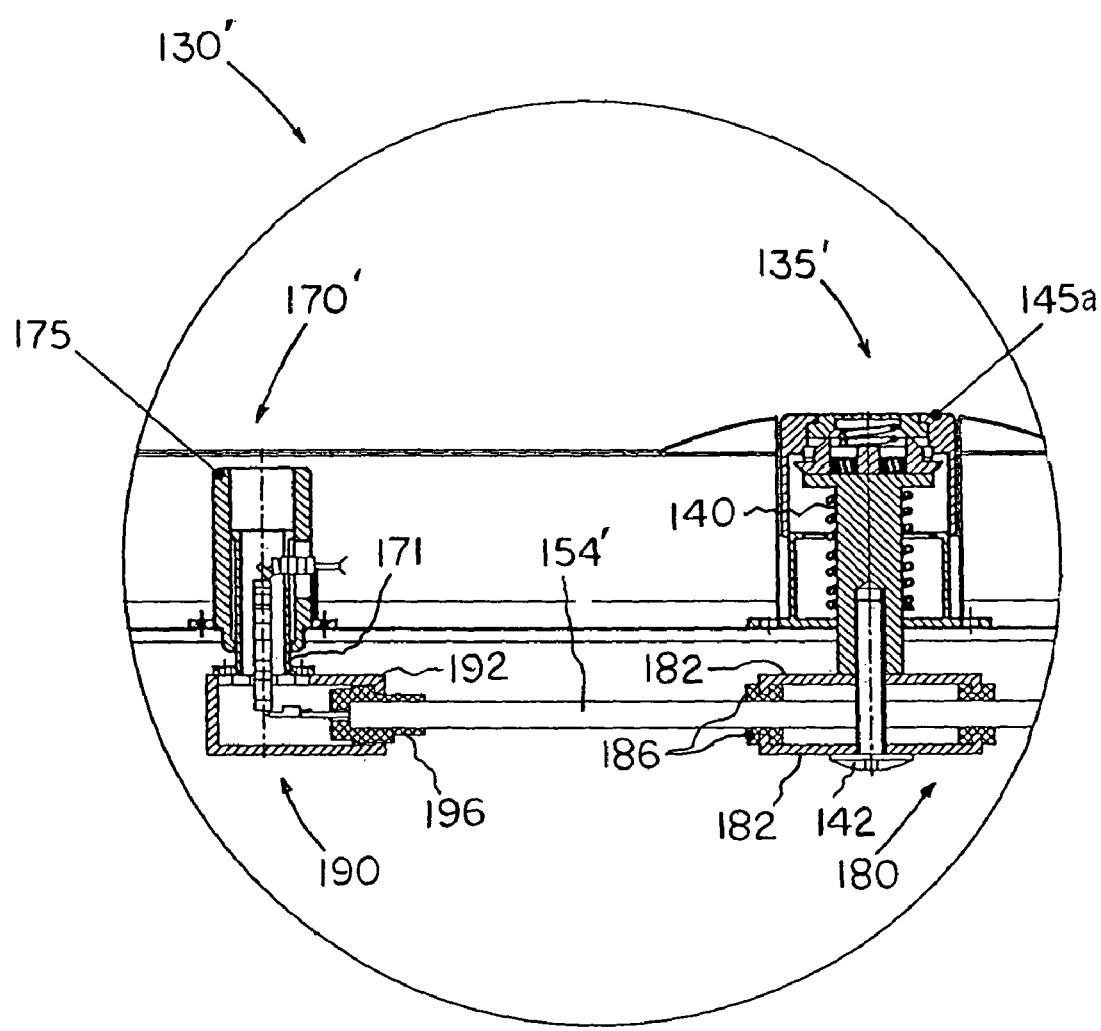
FIG. 21B is an enlarged detail view of the heater shifting mechanism of FIG. 21A in a fully retracted position.

The heater shifting means described hereinabove can also be utilized in combination with the CALROD heating elements of the prior art as illustrated in FIGS. 21A-21B. In this embodiment CALROD heating elements 152', 154' are substantially similar in construction to heating elements 152, 154 previously disclosed herein (FIG. 7). A heater shifting mechanism 130' is provided for shifting upper CALROD heating element 154' into closer proximity to a food item disposed on pan 49 in a manner similar to that described hereinabove. Shifting mechanism 130' includes a modified shift button assembly 135', and modified shift guide assemblies, indicated generally at 170', which provide for the vertical movement of the upper CALROD heating element 154' in this embodiment.

Shift button assembly 135' includes a mounting bracket subassembly 180 comprising a pair of vertically opposed bracket members 182, which attach the CALROD heating element 154' to plunger 140 by means of machine screws 142 as shown Ceramic retainers 186 are captured between bracket members 182 and heating element 154' to protect and insulate the heating element from shift button assembly 135'.

Each shift guide assembly 170' also includes a mounting bracket subassembly 190 comprising a bracket member 192, which attaches the CALROD heating element 154' to tubular guide members 171 by fasteners (not shown). Bracket subassembly 190 also includes a ceramic retainer 196 which is captured between bracket member 192 and CALROD heating element 154' to insulate and protect the heating element. In all other functional aspects the shifting mechanism 130' is substantially similar to that described hereinabove.

Figure 22:
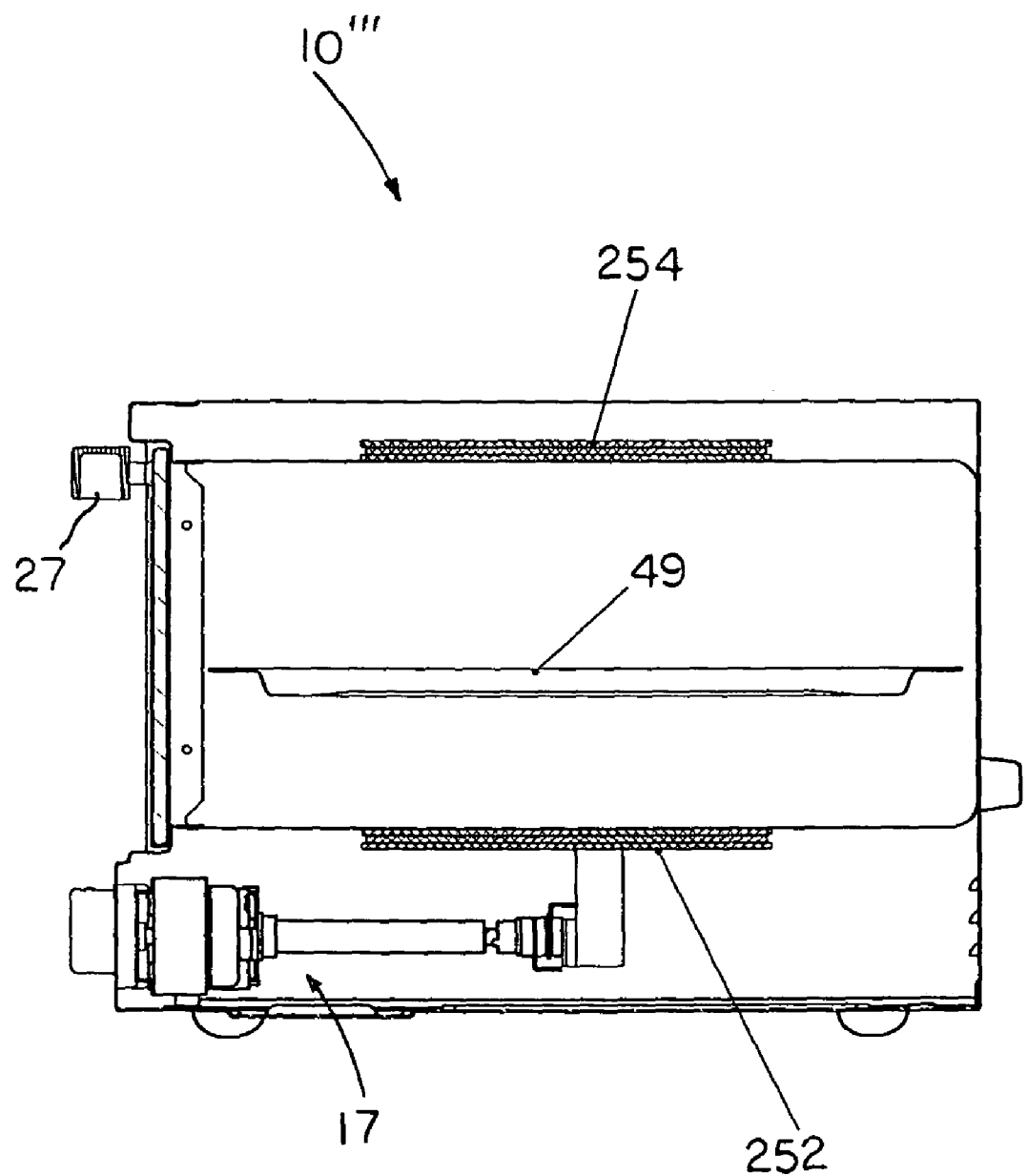
FIG. 22 is a transverse cross-section of another embodiment of the present toaster oven including upper and lower sheathed heating elements mounted externally of the cavity liner.

Referring to FIG. 22 there is shown therein another embodiment of the present toaster oven 10''' wherein lower and upper sheathed heating elements 252, 254 respectively are affixed in position external to cavity liner 40'. More particularly, sheathed heating elements 252, 254 are disposed intermediate outer housing 20 and cavity liner 40' adjacent to the liner as shown. It will be appreciated that in this configuration of toaster oven 10''' the usable capacity of the present oven is maximized.

In this embodiment a plurality of perforations or slots 105 (see FIG. 25B) are formed in a modified cavity liner 40' adjacent to the heating elements 252, 254 for the efficient transfer of heat energy to the cooking chamber. In all other aspects toaster oven 10'' is substantially identical in construction to the toaster oven 10 described hereinabove and illustrated in FIGS. 3A-3B.

Figure 23:
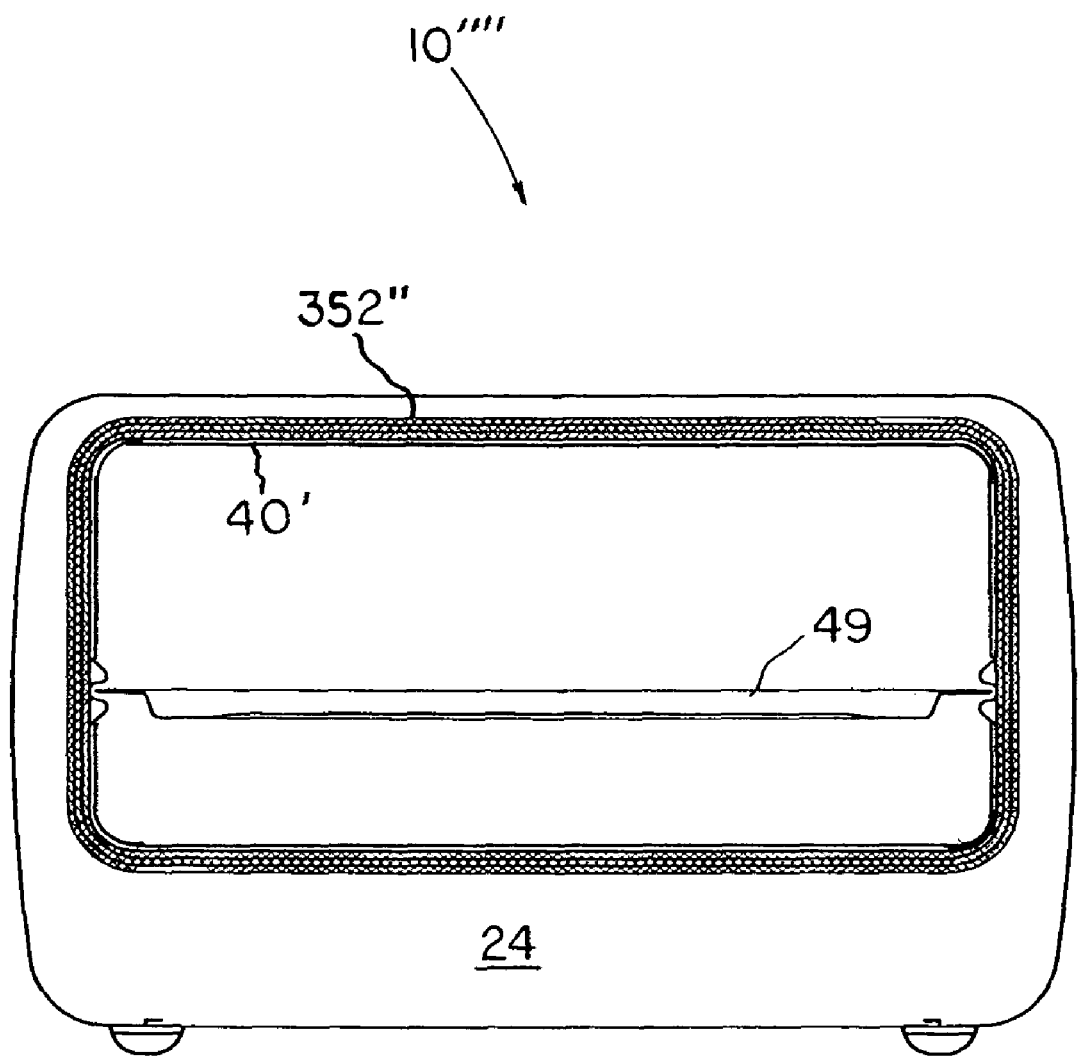
FIG. 23 is a longitudinal cross-section of another embodiment of the present toaster oven including a belt heating element wrapped around the external periphery of the cavity liner.
Figure 24:
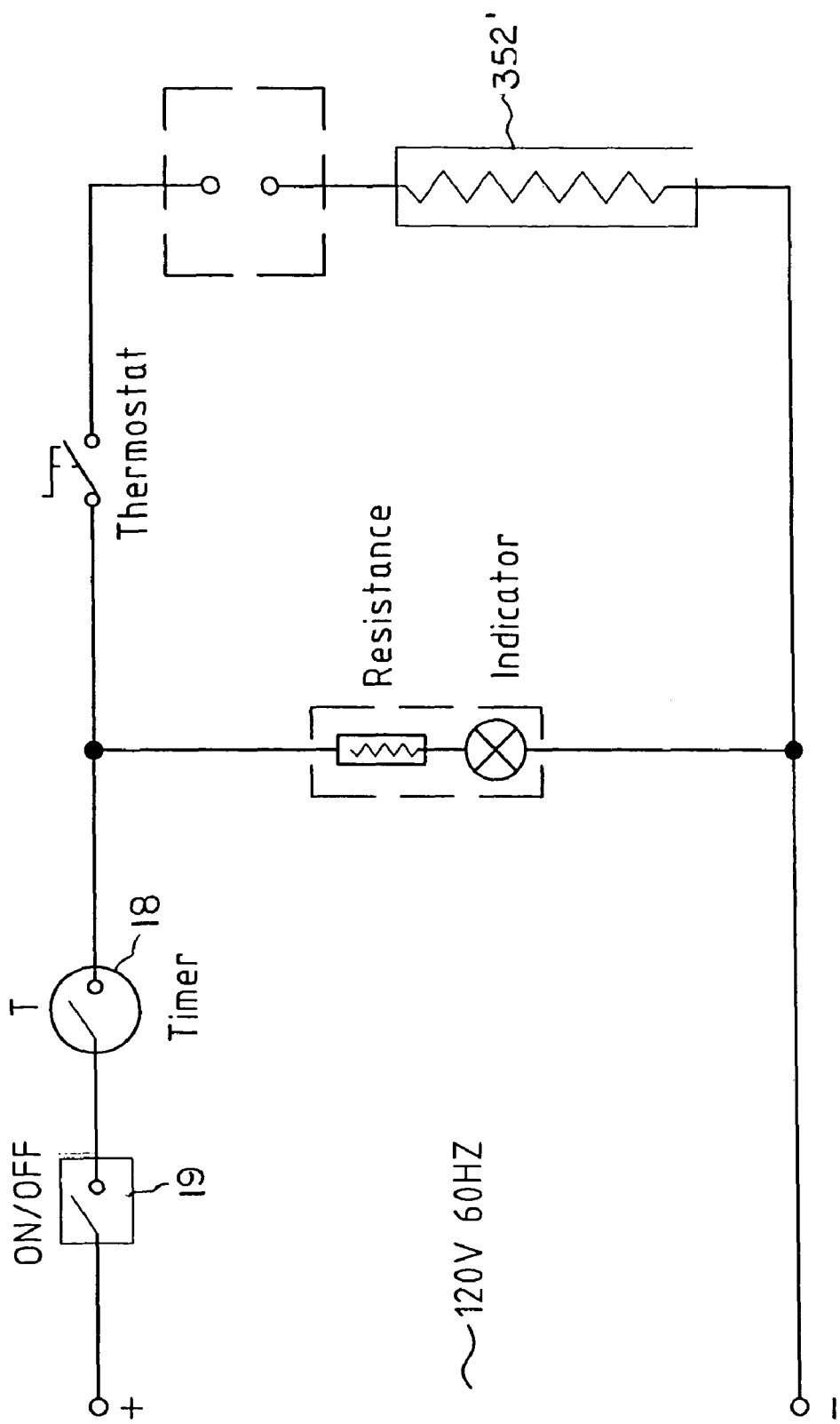
FIG. 24 is a schematic representation of the electrical components and circuitry of the embodiment of the present toaster oven shown in FIG. 23.

In yet another embodiment of the present invention, toaster oven 10'''' is constructed utilizing a sheathed belt heating element 352'' wherein such belt heating element is affixed in position external to cavity liner 40' and is wrapped around the external periphery of the liner 40' as shown in FIG. 23. Sheathed belt heating element 352'' is also disposed intermediate outer housing 20 and cavity liner 40' adjacent to the liner as shown. Similarly, it will be appreciated that this configuration of toaster oven 10''' provides uniform heating while maximizing the usable capacity of the present oven FIG. 24 is a schematic representation of the electrical components and circuitry of the embodiment of the toaster oven 10'''' illustrated in FIG. 23.

Figure 25A:
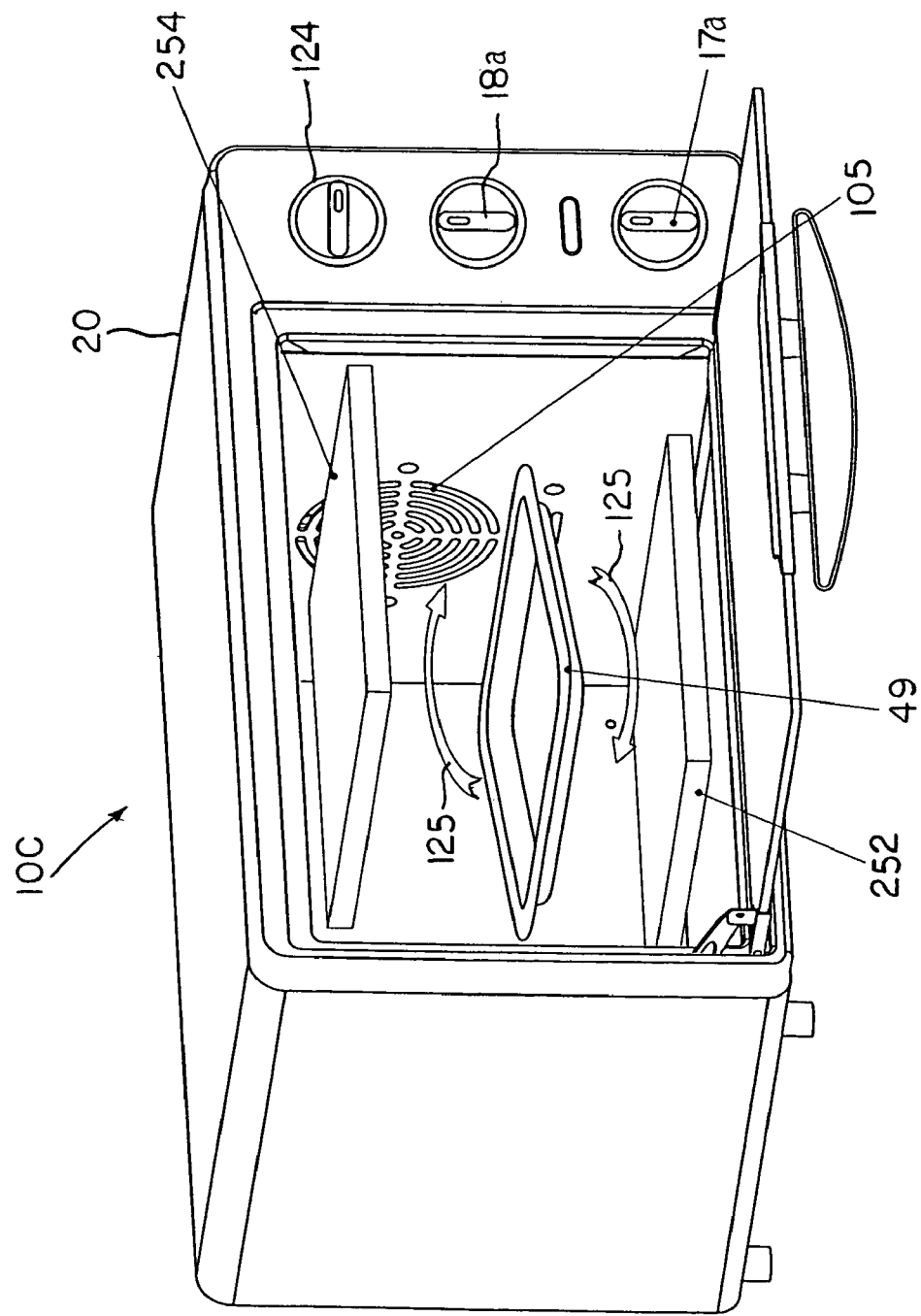
FIG. 25A is a perspective view of another embodiment of the present toaster oven including an optional convection fan.
Figure 25B:
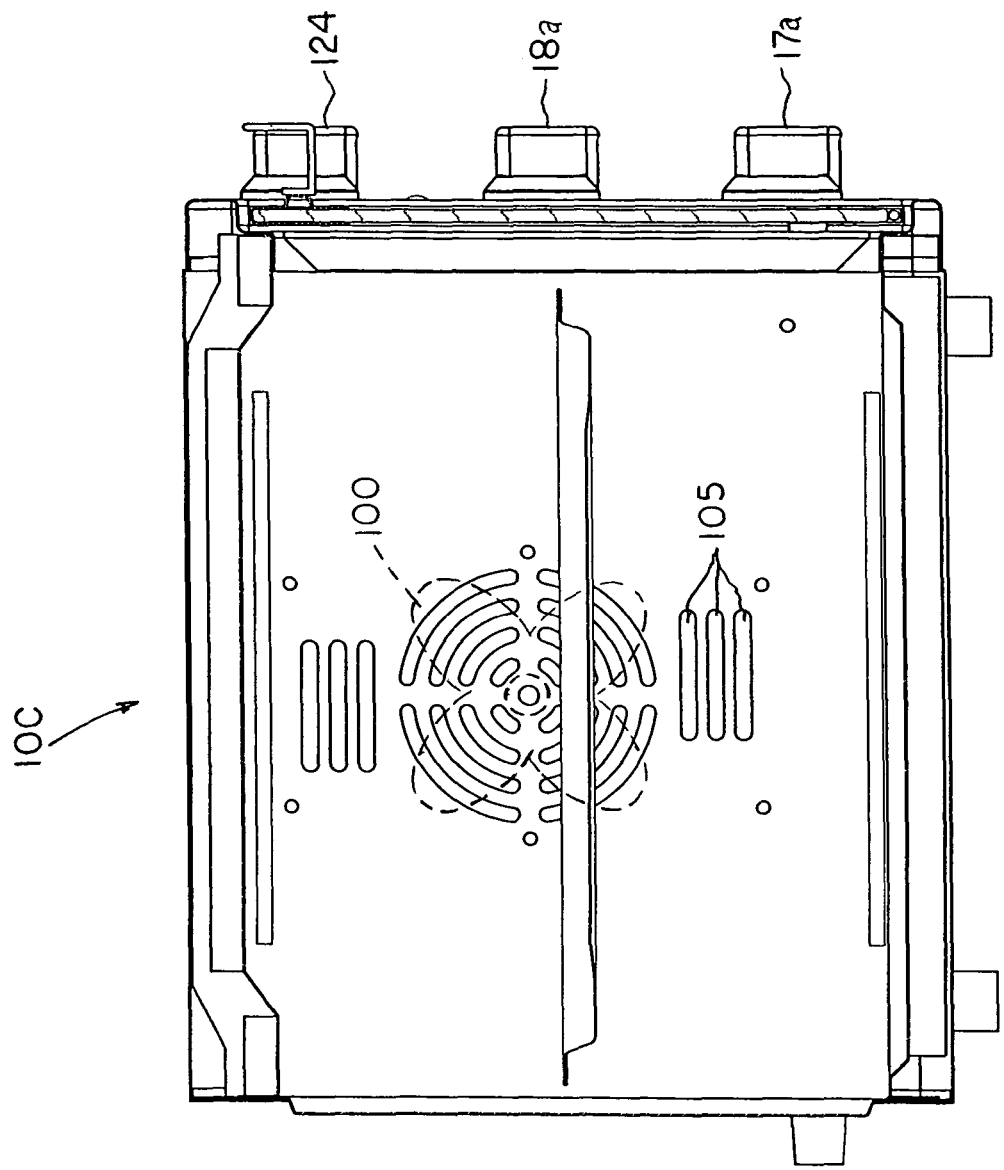
FIG. 25B is a transverse cross-section of the embodiment of the present toaster oven shown in FIG. 25A showing the location of the convection fan.

In still another embodiment of the present invention there is shown a forced convection oven, indicated generally at 10C and illustrated in FIGS. 25A-25B. Forced convection occurs when the motion of a fluid (i.e. air) in this instance is imposed externally such as by a fan 100. In this embodiment convection oven 10C uses air that is forced into the cooking chamber by fan 100 (FIG. 25B) driven by fan motor 102 located in the airspace 50 between cavity liner 40 and external housing 20. Air is forced into the cooking chamber by fan 100 via ventilating slots 105 and circulated (as shown by directional arrows 125) over heating elements 252, 254. By moving such heated air past a food item (not shown) positioned on tray 49, the present oven 10C can operate at a lower temperature and cook food items more quickly than the toaster oven 10 described hereinabove. More particularly, the present convection oven 10C has been demonstrated to provide a 25-30% decrease in cooking time for the same food items.

Figure 26:
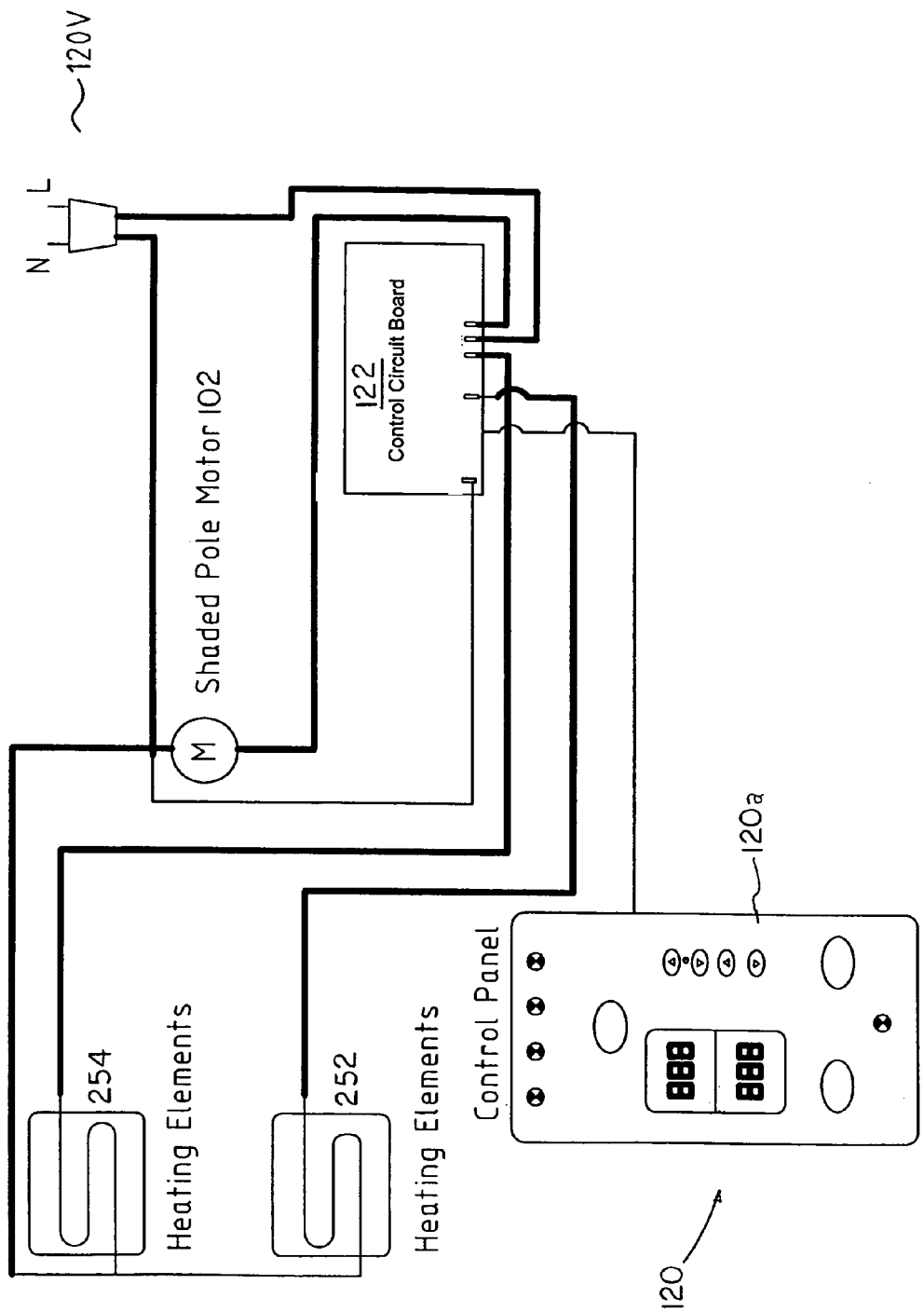
FIG. 26 is a schematic representation of the electrical components and circuitry of an embodiment of the present toaster oven including a convection fan with an electronic control panel.

Referring to FIG. 26 there is shown a schematic representation of the electrical components and circuitry of the present convection oven 10C illustrated in FIGS. 25A-25B. The electrical functions of convection oven 10C can be carried out by standard electromechanical controls as shown in FIG. 25A including fan ON/OFF switch 124. Alternatively, the electrical functions of convection oven 10C may be carried out by an electronic control panel 120 having a touch screen interface 120a with an integrated control circuit board 122 as shown in FIG. 26.

Figure 27:
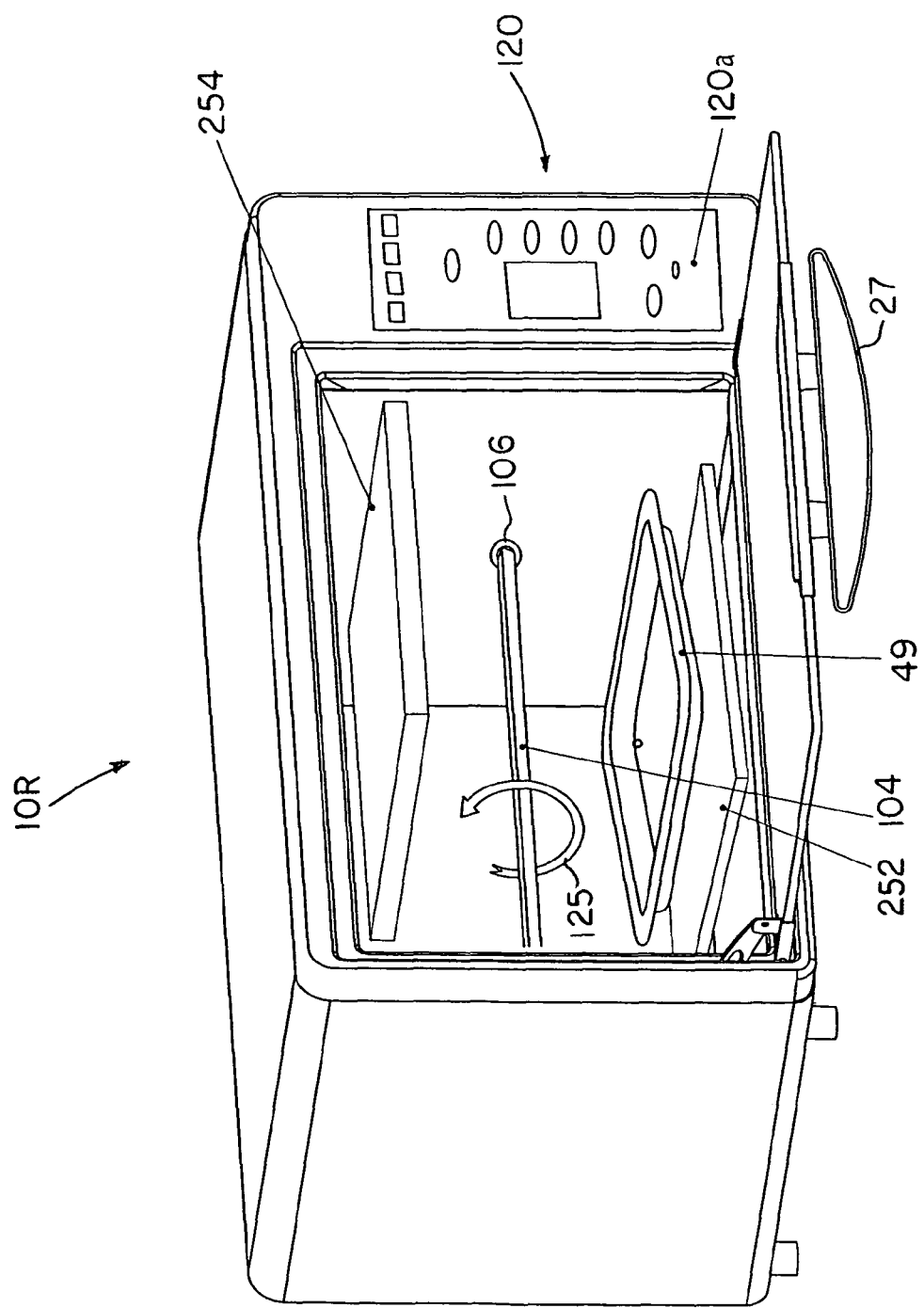
FIG. 27 is a perspective view of another embodiment of the present toaster oven including a rotisserie mechanism with an electronic control panel including a control circuit board.

Still another embodiment of the present oven, indicated generally at 10R and illustrated in FIG. 27, provides a rotisserie bar 104 whereon a chicken or other similar food item is skewered for cooking. In this embodiment a synchronous motor 102' located in the airspace 50 between cavity liner 40 and external housing 20 is utilized to rotate rotisserie bar 104 (as shown by directional arrow 125) at a predetermined speed. Rotisserie bar 104 is engaged in a fitting 106 which is driven by motor 102' and protrudes through cavity liner 40''.

Figure 28:
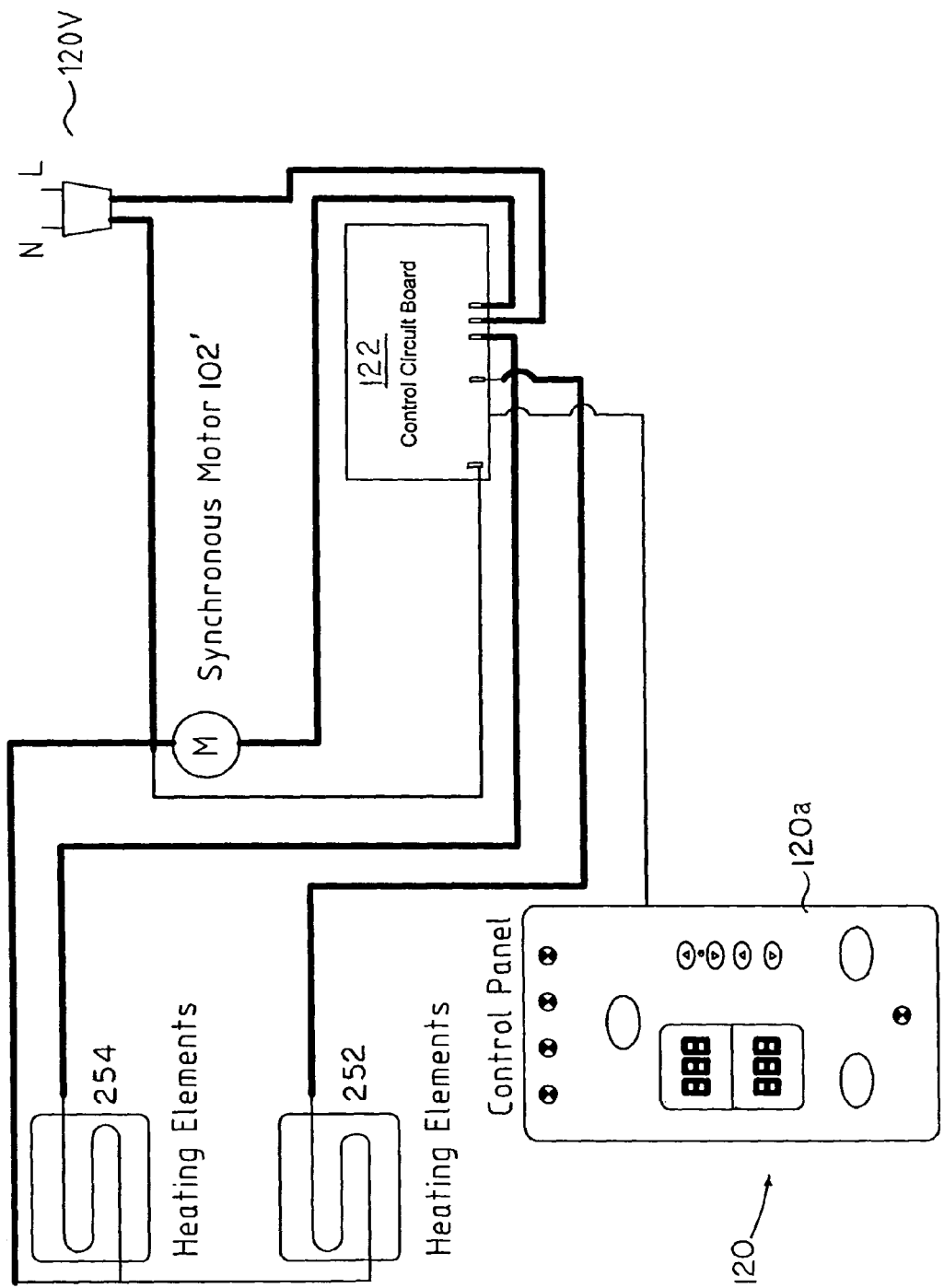
FIG. 28 is a schematic representation of the electrical components and circuitry of an embodiment of the present toaster oven including a rotisserie mechanism with an electronic control panel including a control circuit board.

Referring to FIG. 28 there is shown therein a schematic representation of the electrical components and circuitry of the present rotisserie oven 10R illustrated in FIG. 27. The electrical functions of rotisserie oven 10R can be carried out by standard electromechanical controls as described hereinabove or, in the alternative, may be carried out by an electronic control panel 120 having a touch-based interface 120 with an integrated control circuit board 122 as shown in FIG. 27.

Although not specifically illustrated in the drawings, it should be understood that additional equipment and structural components will be provided as necessary and that all of the components described above are arranged and supported in an appropriate fashion to form a complete and operative Toaster Oven with Low Profile Heating Elements incorporating features of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

What is claimed is:

1. A toaster oven comprising:
a housing including an openable door member;
a cavity liner residing within said housing, wherein said liner defines a cooking chamber, said liner comprising a top surface, a bottom surface, integrally formed sidewalls, and a back wall extending between said top and bottom surfaces defining a forward facing open end of said liner, wherein said door member is disposed in closing relation to said open end;
heating means including at least one single-sided low-profile heating element, wherein said at least one single-sided low-profile heating element is constructed by wrapping a heating wire about a flat mica insulation board, wherein said single-sided low-profile heating element is installed internally of said cavity liner adjacent to said top surface thereof;
a heater shifting mechanism for adjusting the distance of said single-sided low-profile heating element relative to a food item, wherein said heater shifting mechanism includes a spring actuated shift-button assembly, said shift-button assembly being directly attached to said single-sided low-profile heating element, said shift-button assembly extending through said top surface of said liner from an exterior of said housing into said cooking chamber, wherein said shift-button assembly functions to impart vertical movement to said single-sided low-profile heating element when manual pressure is applied to said shift-button assembly;

temperature controlling means electrically interconnected to said at least one single-sided low-profile heating element for regulating the cooking temperature thereof; and function controlling means electrically interconnected to said at least one single-sided low-profile heating element.

2. The toaster oven of claim 1 wherein said at least one single-sided low-profile heating element has a single-sided surface area sufficient to cover at least twenty-five per cent of said top surface and said bottom surface of said cavity liner to provide heating.

3. The toaster oven of claim 1 wherein said heating means further includes at least one low-profile, side heating element installed adjacent to and internally of said sidewalls of said cavity liner.

4. The toaster oven of claim 1 wherein said mica insulation board and said heating wire are encased in a sheath.

5. The toaster oven of claim 4 wherein said sheath includes a plurality of openings formed therein.

6. The toaster oven of claim 1 wherein said at least one single-sided low-profile heating element is spring biased to a position adjacent said top surface of said liner in a fully retracted condition of said shift-button assembly.

7. The toaster oven of claim 6 wherein said single-sided low-profile heating element is locked in spaced-apart relation to said top surface of said liner in a fully extended position of said shift-button assembly when manual pressure is applied to said shift-button assembly.

8. The toaster oven of claim 1 wherein said heater shifting means further includes at least one shift guiding assembly attached to said single-sided low-profile heating element to prevent binding during vertical travel thereof, wherein said shift-guiding assembly comprises a tubular guide member attached to said single-sided low-profile heating element, said tubular guide member engaging a tubular guide track mounted within said top surface of said liner to provide sliding vertical movement of said heating element.

9. The toaster oven of claim 1 further including a convection fan, wherein said fan is driven by a fan motor disposed intermediate said housing and said liner.

10. The toaster oven of claim 1 further including a digital control panel having a touch-based interface for controlling the functions of said oven.

11. The toaster oven of claim 1 further including a rotisserie mechanism disposed within said oven, wherein said rotisserie mechanism is driven by a synchronous motor disposed intermediate said housing and said liner.

12. The toaster oven of claim 1 wherein said at least one single-sided low-profile heating element is constructed as a removable plug-in module having a quick connect/disconnect electrical plug.

13. A toaster oven comprising:

a housing including an openable door member;

a cavity liner of unitary construction residing within said housing, wherein said liner defines a cooking chamber, said liner comprising a top surface, a bottom surface, integrally formed sidewalls, and a back wall extending between said top and bottom surfaces defining a forward facing open end of said liner, wherein said door member is disposed in closing relation to said open end;

heating means including at least one single-sided low-profile heating element installed adjacent to and internally of said cavity liner adjacent said top surface of said liner;

a heater shifting mechanism for adjusting the distance of said at least one single-sided low-profile heating element relative to a food item, wherein said heater shifting mechanism includes a spring actuated shift-button assembly having a locking mechanism, said shift-button assembly being attached to said single-sided low-profile heating element, said shift-button assembly extending through said to surface of said liner from an exterior of said housing into said cooking chamber, wherein said shift-button assembly functions to impart vertical movement to said at least one single-sided low-profile heating element within said cooking chamber;

temperature controlling means electrically interconnected to said at least one single-sided low-profile heating element for regulating the cooking temperature thereof; and function controlling means electrically interconnected to said at least one single-sided low-profile heating element.

14. The toaster oven of claim 13 wherein said at least one single-sided low-profile heating element is constructed by wrapping a heating wire about a flat mica insulation board having a plurality of notches formed along lateral edges thereof, said heating wire being traversed across said mica insulation board between diagonally opposed pairs of said notches, said heating wire being alternately interlaced between adjacent pairs of said notches to form said single-sided low-profile heating element.

15. The toaster oven of claim 14 wherein said single-sided low-profile heating element is installed within said cavity liner adjacent thereto to increase usable capacity within said cooking chamber.

16. The toaster oven of claim 13 wherein said single-sided low-profile heating element is spring biased to a position adjacent said top surface of said liner in a fully retracted position of said shift-button assembly.

17. The toaster oven of claim 16 wherein said single-sided low-profile heating element is locked in spaced-apart relation to said top surface of said liner in a fully extended position of said shift-button assembly when manual pressure is applied to said shift-button assembly.

18. The toaster oven of claim 13 wherein said heater shifting mechanism further includes a pair of shift guiding assemblies attached to said single-sided low-profile heating element to prevent binding thereof during its vertical travel, wherein said shift guiding assemblies comprise a guide member attached to said single-sided low-profile heating element, said guide member engaging a guide track mounted within said top surface of said liner to provide sliding vertical movement of said heating element.

19. The toaster oven of claim 13 further including a convection fan, wherein said fan is driven by a fan motor disposed intermediate said housing and said liner.

20. The toaster oven of claim 13 further including a digital control panel having a touch-based interface for controlling the functions of said oven.

21. The toaster oven of claim 13 further including a rotisserie mechanism disposed within said oven, wherein said rotisserie mechanism is driven by a synchronous motor disposed intermediate said housing and said liner.

22. The toaster oven of claim 13 wherein said at least one single-sided low-profile heating element is constructed as a removable plug-in module having quick connect/disconnect electrical plugs.

23. The toaster oven of claim 13 wherein said heating means comprises at least one upper tubular heating element positioned in close proximity to said top surface of said cavity liner.

24. The toaster oven of claim 23 wherein said at least one upper tubular heating element is a CALROD heating element.

25. The toaster oven of claim 23 wherein said at least one upper tubular heating element is attached to said shift-button assembly for adjusting the position of said at least one upper tubular heating element relative to a food item within said cooking chamber.

26. The toaster oven of claim 25 wherein said at least one upper tubular heating element is spring biased to an unlocked position in close proximity to said top surface of said liner in a fully retracted position of said shift-button assembly.

27. The toaster oven of claim 26 wherein said upper tubular heating element is locked in spaced-apart relation to said top surface of said liner in a fully extended position of said shift-button assembly when manual pressure is applied to said shift-button assembly.

* * * * *